United States Patent [19]

Hiraishi et al.

[11] Patent Number: 6,076,550
[45] Date of Patent: Jun. 20, 2000

[54] SOLENOID AND SOLENOID VALVE

[75] Inventors: Kazuo Hiraishi; Itsunao Koga; Hiroyuki Seki; Taisuke Houei; Takanobu Matsufuji; Yoshinori Nishimoto; Katsuhiro Kawahara, all of Kitakyushu, Japan

[73] Assignee: Toto Ltd., Fukuoka, Japan

[21] Appl. No.: 08/836,244

[22] PCT Filed: Sep. 9, 1996

[86] PCT No.: PCT/JP96/02567

§ 371 Date: May 5, 1997

§ 102(e) Date: May 5, 1997

[87] PCT Pub. No.: WO97/09727

PCT Pub. Date: Mar. 13, 1997

[30] Foreign Application Priority Data

Sep. 8, 1995 [JP] Japan ................................ 7-231860
Nov. 30, 1995 [JP] Japan ................................ 7-346582

[51] Int. Cl.[7] .......................... H01F 7/16; F16K 31/365
[52] U.S. Cl. ...................... 137/550; 251/38; 251/30.03; 335/255; 335/281
[58] Field of Search .................... 251/65, 38, 30.04, 251/30.03, 129.15; 335/255, 261, 277, 281, 279; 137/550

[56] References Cited

U.S. PATENT DOCUMENTS

| | | |
|---|---|---|
| 4,290,039 | 9/1981 | Tochizawa . |
| 5,217,200 | 6/1993 | Hutchings et al. ............... 251/65 X |
| 5,259,416 | 11/1993 | Kunz et al. ............... 251/65 X |
| 5,363,873 | 11/1994 | Richmond ............... 251/30.03 X |
| 5,573,224 | 11/1996 | Kim ............... 251/30.04 |

FOREIGN PATENT DOCUMENTS

| | | |
|---|---|---|
| 62-228684 | 7/1987 | Japan . |
| 6-168819 | 6/1994 | Japan . |
| 6-174135 | 6/1994 | Japan . |

*Primary Examiner*—Kevin Lee
*Attorney, Agent, or Firm*—Birch, Stewart, Kolasch & Birch, LLP

[57] ABSTRACT

A solenoid comprising a solenoid coil having a longitudinal hole at the center of a bobbin made of a non-magnetic material and a coil winding wound around the peripheral wall of the bobbin. A yoke comprising a peripheral side plate, an upper end plate and a lower end plate all for the covering the outer peripheral surface and both end surfaces of solenoid coil, a pole core disposed at one end of the longitudinal hole and a plunger fitted slidably into the other end of the longitudinal hole. The solenoid further comprises a protrusion member for forming an irregular magnetic field, formed integrally at the center of the yoke, and a recess for fitting the protrusion member from the end surface of the peripheral wall of the bobbin formed in the peripheral wall. A diaphragm of a solenoid valve for opening and closing a main valve port, opened and closed by the movement of the plunger operating at a constant stroke above a predetermined feed water pressure and at a stroke proportional to the water drainage pressure below the predetermined feed water pressure.

19 Claims, 17 Drawing Sheets

MAGNETIC PROPERTY OF MAGNETIC BODY

RELATIONSHIP BETWEEN MAGNETIC FLUX PASSING AREA
AND SATURATION POINT OF MAGNETIC FLUX DENSITY

PLUNGER AND CORE SECTION VIEW

SOLENOID AND SOLENOID VALVE

TECHNICAL FIELD

The present invention relates to a solenoid and a solenoid valve.

BACKGROUND ART

A solenoid valve driving a plunger is provided with an electromagnetic coil encapsulated in a yoke. A longitudinal hole is formed at the center of the electromagnetic coil and a cylindrical plunger guide is mounted in the longitudinal hole. Further, a pole core is fixedly fitted to the upper portion of the plunger guide and the plunger moving relative to the pole core is abrasively inserted into the plunger guide. Also, a bleed hole communicating with water supply source and a pilot hole communicating with the secondary side of water supply are installed to a diaphragm provided to a diaphragm valve.

According to such a structure, the outer shell of a solenoid is formed by the yoke, a lower end plate thereof and a pole core fixing plate to which the pole core is fixed. Further, the plunger is operated movably to and from a through hole at a yoke lower end plate by receiving a magnetic sucking action caused by the electromagnetic force generated by conducting electricity to the electromagnetic coil. Thereby, the diaphragm valve is opened and closed by opening and closing the pilot hole of the diaphragm in accordance with the movement of the plunger.

The field of use of a solenoid valve for water supply control has been diversified in recent years and, for example, the valve is adopted in water related devices in general life such as an automatic cock, a privates washing device and the like. Hence, reduction in cost and further downsizing have been desired by the market.

However, there is a limitation in dealing with the downsizing according to the above-described structure and there are various hazards in achieving the further downsizing thereof.

That is, in downsizing a solenoid valve, plunger stroke or diaphragm area may be reduced in order to simply downsize it. However, it is known that handling performance of a solenoid valve for water supply control is deteriorated unless it is used normally under a hydraulic pressure of 0.5 through 10 kg/cm$^2$ and a flow rate of approximately 20 liter per minute is ensured even under aminimum hydraulic pressure of use.

Therefore, there is a limitation in decreasing the plunger stroke or the diaphragm area. On the other hand, if other constitutions are to be reconstructed, deterioration in the function, or deterioration in the water proof function may be caused. Therefore, it is extremely difficult to achieve downsizing exceeding the current state while maintaining the function.

It is an object of the present invention to provide a solenoid and a solenoid valve capable of solving the above-described problem.

DISCLOSURE OF THE INVENTION

In order to resolve such a problem, a solenoid and a solenoid valve of the present invention are provided with the following constitutions.

That is, according to a solenoid of a first invention, there is provided solenoid for driving a plunger, comprising:

an electromagnetic coil having a region-defining member made of a nonmagnetic material for defining a moving region in which the plunger is moving, and a coil winding portion wound around the region-defining member to generate a magnetic field of a first magnetic flux path penetrating the moving region along a direction of moving of the plunger, the electromagnetic coil exerting a magnetic force of the first magnetic flux path on the plunger;

an irregular magnetic field forming member made of a magnetic material and arranged at an external side of a partitioning face formed to partition the moving region and on an end side of the region-defining member opposed to the plunger, the irregular magnetic field forming member forming a second magnetic flux path of the magnetic field formed by the electromagnetic coil at the external side of the partitioning face from the end side of the region-defining member, the irregular magnetic field forming member exerting a magnetic force of the second magnetic path from a top end of the irregular magnetic field forming member on the plunger via the partitioning face; and an encapsulating member having an encapsulating portion formed to be able to arrange one of the irregular magnetic field forming members on the end side of the region-defining member opposed to the plunger, the irregular magnetic field forming members having different lengths from the end side of the region-defining member to the encapsulating member at the external side of the partitioning face.

According to the solenoid of the first invention, in addition to the magnetic force of the magnetic field of the first magnetic flux path penetrating the moving region, the magnetic force of the magnetic field of the second magnetic flux path at the external side of the partition face of the moving region is also exerted from the top end of the irregular magnetic field forming member. So that, the sucking operation of the plunger can be carried out by the magnetic forces of the both magnetic fields and accordingly, a large magnetic force is exerted on the plunger by the coil winding portion having a small turn number whereby the plunger can be moved and accordingly the solenoid can be opened and closed only by conducting very small current to the electromagnetic coil.

Furthermore, the irregular magnetic field forming member for exerting the magnetic force of the secondmagnetic flux path is encapsulated in the encapsulating member even if the length thereof from the one end side of the region forming member differs whereby the length of the irregular magnetic field forming member can be adjusted. The magnitude of the magnetic force of the second magnetic flux path exerting from the top end of the irregular magnetic field forming member on the plunger, is determined by a positional relationship between the irregular magnetic field forming member and the plunger, that is, the length of the irregular magnetic field forming member. Therefore, the magnitude of the magnetic force exerting on the plunger can be adjusted by adjusting the length of the irregular magnetic field forming member and the magnetic force of the magnetic field of the second magnetic flux path can be exerted most efficiently on the plunger through adjustment of the magnitude of the magnetic force. Therefore, according to solenoid of the first invention, the turn number of the coil winding portion can be made smaller than that of a solenoid where an irregular magnetic field forming member which has not been subjected to such an adjustment is arranged. Accordingly, the downsizing of the coil winding portion per se can be achieved through which a further downsizing of the solenoid per se can be achieved.

According to a solenoid of a second invention, there is provided a solenoid for driving a plunger, comprising:

an electromagnetic coil having a region-defining member made of a nonmagnetic material for defining a moving region in which the plunger is moving, and a coil winding portion wound around the region-defining member to generate a magnetic field of a first magnetic flux path penetrating the moving region along a direction of moving of the plunger, the electromagnetic coil exerting a magnetic force of the first magnetic flux path on the plunger;

an irregular magnetic field forming member made of a magnetic material and arranged at an external side of a partitioning face formed to partition the moving region and on an end side of the region-defining member opposed to the plunger, the irregular magnetic field forming member forming a second magnetic flux path of the magnetic field formed by the electromagnetic coil at the external side of the partitioning face from the end side of the region-defining member, the irregular magnetic field forming member exerting a magnetic force of the second magnetic path from a top end of the irregular magnetic field forming member on the plunger via the partitioning face; and an encapsulating member having an encapsulating portion formed to be able to arrange one of the irregular magnetic field forming members at the external side of the partitioning face and on the end side of the region-defining member opposed to the plunger, wherein the irregular magnetic field forming member is arranged at the encapsulating portion after adjusting of a magnitude of the magnetic force exerted on the plunger.

Even with the solenoid of the second invention, the magnetic forces of the magnetic fields of the first and the second magnetic flux paths are exerted on the plunger. Accordingly, the plunger can be moved and accordingly, the solenoid can be opened and closed by exerting large magnetic forces on the plunger by conducting very small current, or by the coil winding portion having a small turn number similar to the first invention.

Further, according to the solenoid of the second invention, the irregular magnetic field forming member for exerting the magnetic force of the second magnetic flux path is arranged after having been subjected to the adjustment of the magnitude of the magnetic force by the second magnetic flux path exerted on the plunger from the top end thereof. Therefore, even with the solenoid of the second invention, the magnetic force of the magnetic field of the second magnetic flux path can also be exerted on the plunger most efficiently whereby the turn number of the coil winding portion can be made smaller than that of a solenoid where an irregular magnetic field forming member which has not been subjected to such an adjustment is arranged. Accordingly, downsizing of the coil winding portion per se can be achieved through which a further downsizing of the solenoid per se can be achieved.

Further, the above-described first and second inventions can adopt the following embodiments. According to a first embodiment of the solenoid, there is provided a solenoid:

wherein the region-defining member comprises a bobbin (11) to partition a longitudinal hole (11c) in which the plunger is moving, the bobbin having a peripheral wall (11d) having a recess (11f) formed to subside along the longitudinal hole (11c) such that the irregular magnetic field forming member can be arranged opposed to the plunger;

wherein the electromagnetic coil is provided with a coil winding (12) directly wound around the peripheral wall (11d) of the bobbin (11); and wherein the irregular magnetic field forming member is arranged to fit into the recess (11f).

According to the solenoid of the first embodiment, the irregular magnetic field forming member is arranged at the recess (11f) formed to subside at the peripheral wall (11d) of the bobbin (11) and the peripheral wall (11d) constitutes a core of the coil winding (12). Therefore downsizing in the diameter direction can be achieved through common formation of members.

According to a solenoid of a second embodiment of the first and the second inventions, there is provided a solenoid comprising:

a yoke (2) having an upper side end plate (22) and a lower end plate (23) disposed above and below the electromagnetic coil respectively, and a peripheral side plate (21) disposed between the upper and under side end plates for surrounding the electromagnetic coil;

a pole core (16) arranged at one end of the longitudinal hole (11c) in contact with the upper end plate (22); and wherein the irregular magnetic field forming member is installed adjacent to an end portion of the lower end plate (23) on a side of the peripheral wall (11d).

According to the solenoid of the second embodiment, the irregular magnetic field forming member is installed continuously to the lower end plate (23) of the yoke (2) and therefore, the handling is facilitated. Further, when the adjustment of the length of the irregular magnetic field forming member is needed after arranging it to the recess (11f), it is preferable that the arranged irregular magnetic field forming member is removed along with the lower end plate (23) of the yoke (2). Further, the plunger and the pole core are opposed to each other in the longitudinal hole (11c) and therefore, the first and the second magnetic fluxes of the magnetic field exerting the magnetic force on the plunger, is developed also to the pole core and therefore, the magnetic force efficiency can further be promoted through which the downsizing can be achieved by further reducing the number of coil.

Further, according to a solenoid of the third embodiment of the first and the second inventions, there is provided a solenoid:

wherein the bobbin (11) is provided with a projecting portion (11h) extended more externally than the peripheral wall (11d) which is extended from the lower end plate (23)

According to the solenoid of the third embodiment, the projecting portion (11h) extended from the peripheral wall (11d) of the bobbin (11) can be used for mounting other member that is attached onto the lower face of the lower end plate (23), for example, a packing for achieving sealing operation in respect of the diaphragm valve or the like. Therefore, the waterproof measure can be adopted simply in respect of the diaphragm valve or the like.

Further, according to a solenoid of a third invention, there is provided a solenoid comprising an electromagnetic coil (1) including a longitudinal hole (11c) formed at a central portion of a bobbin (11) made of a nonmagnetic material and a coil winding (12) wound around a peripheral wall (11d) thereof, a yoke (2) having a peripheral side plate (21), an upper end plate (22) and a lower end plate (23) to cover an outer peripheral face and both end faces of the electromagnetic coil (1), a pole core (16) arranged at one end of the longitudinal hole (11c) and a plunger (15) inserted movably into the longitudinal hole (11c), characterized in that;

a coil winding end treating space (Q) where the coil winding (12) is not wound is formed at an outer peripheral face of the pole core (16), an opening (26) for drawing a coil winding of a coil winding end portion (20) to outside is provided to the yoke (2) and the opening (26) is closed by a waterproofing means.

According to the solenoid of the third invention, the coil winding end portion (20) is drawn to the outside via the opening (26) at the coil winding end portion treating space (Q) at the outer peripheral face of the pole core (16) and the drawing portion is a portion remote from the coil winding (12). Further, the opening (26) is closed in waterproof. Therefore, it is not necessary to perform resin molding in respect of the drawing portion of the coil winding along with the coil winding end portion (20) and the coil winding (12) whereby the volume of the winding portion of the coil winding, that is, the volume of the electromagnetic coil (1) per se can extremely be reduced. Therefore, the downsizing of the solenoid can be achieved.

In this case, when the opening (26) is closed by the rubber bush (25), the waterproof of the opening can be ensured.

Further, according to a solenoid of a fourth invention, there is provided a solenoid comprising an electromagnetic coil (1) having a longitudinal hole (11c) formed at a central portion of a bobbin (11) made of a nonmagnetic material and a coil winding (12) wound around a peripheral wall (11d) thereof, a yoke (2) arranged at an outer periphery of the electromagnetic coil (1), a pole core (16) arranged at one end of the longitudinal hole (11c) and a plunger (15) inserted movably into the longitudinal hole (11c), characterized in that:

a permanent magnet (17) is arranged at an external side of the pole core (16) and a coil winding end portion treating space (Q) where the coil winding (12) is not wound is formed at an outer peripheral face of the bobbin (11) corresponding to the permanent magnet (17).

According to the solenoid of the fourth invention, the region of arranging the permanent magnet (17) and the coil winding end portion treating space (Q) can be made contiguous on the side of the outer periphery of the bobbin (11) whereby downsizing of the solenoid can be achieved through space saving.

According to a solenoid of a fifth invention, there is provided a solenoid comprising an electromagnetic coil (1) having a longitudinal hole (11c) formed at a central portion of a bobbin (11) made of a nonmagnetic material and a coil winding (12) wound around a peripheral wall (11d), a yoke (2) arranged at an outer periphery of the electromagnetic coil (1), a pole core (16) arranged at one end of the longitudinal hole (11c) and a plunger (15) inserted movably into the longitudinal hole (11c), characterized in that:

a permanent magnet (17) is arranged at an external side of the pole core (16) and major components of the permanent magnet are constituted by rare earth metals including neodymium-iron-boron, samarium-cobalt or the like.

According to the solenoid of the fifth invention, the permanent magnet (17) arranged at the external side of the pole core (16) is a magnet whose major components are specific rare earth metals forming a strong magnetic field and therefore, a sufficiently strong magnetic field can be provided even if the volume of the magnet is reduced.

Accordingly, the downsizing of the solenoid can be achieved since a magnet having a volume smaller than that of a conventional solenoid is arranged.

The above-described solenoids of the fourth and the fifth inventions may adopt a following embodiment. According to the solenoid of the embodiment, there is provided a solenoid comprising:

a magnetic member surrounding the permanent magnet (17) over a side face thereof and adjusting a magnetism which is exerted by a magnetic field formed by the permanent magnet (17) on the plunger (15).

According to the solenoid of the embodiment, the electromagnetic force for closing the valve can be weakened by generating an attenuating magnetic field between the magnetic member and the permanent magnet (17) by the magnetic member for adjusting magnetism. Therefore, the plunger can be easily separated from the side of the permanent magnet. Accordingly, the downsizing of the solenoid can be achieved since it is not necessary to enlarge the return spring or the like necessary for separating the plunger more than necessary.

According to a solenoid valve of a sixth invention, there is provided a solenoid valve comprising an electromagnetic coil (1) having a longitudinal hole (11c) formed at a central portion of a bobbin (11) made of a nonmagnetic material and a coil winding (12) wound around a peripheral wall (11d) thereof, a yoke (2) arranged at an outer periphery of the electromagnetic coil (1), a permanent magnet (17) forming a magnetic field in the yoke (2), a pole core (16) arranged at one end of the longitudinal hole (11c), a plunger (15) inserted movably into the longitudinal hole (11c) and a return spring (19) for separating the plunger (15) from the pole core, characterized in that:

a separating force of the return spring is set to be larger than a suction force by a magnetic field of the permanent magnet at an upper limit position which is reached by the plunger after naturally falling from a position at which the plunger is sucked to the pole core and being bounded by a valve seat.

According to the solenoid valve of the sixth invention, when the plunger sucked to the pole core is separated to the side of the valve seat, the plunger is disposed on the side of the valve seat by receiving from the return spring the separating force larger than the suction force by a magnetic field of the permanent magnet. Therefore, the plunger can be moved in the valve closing direction easily and firmly by the return spring.

Further, according to a solenoid valve of a seventh invention, there is provided a solenoid valve where a pilot valve hole (31) and a bleed hole (32) are installed to a diaphragm (3) and a main valve hole (63) is opened and closed by opening and closing the pilot valve hole (31) by a movement operation of a plunger (15) of a solenoid (B), characterized in that:

the diaphragm (3) has with a reaction force characteristic where a reaction force is maintained constant at a first stroke or more and the reaction force is proportional to a pressure of water supply at below the first stroke.

According to the solenoid valve of the seventh invention, the pressure operated on the diaphragm is a low pressure and when the stroke is small, it achieves a reaction force in proportion to the pressure of water supply. Therefore, the water cut-off capability and the valve opening capability are not lowered even at the low pressure, the solenoid valve is provided with a stable operational characteristic even if it is small-sized and a sufficient water discharge amount can be firmly provided. Therefore, for example, the downsizing of the valve portion occupying a large volume in a sensitive type flush valve, an automatic cock or the like, can be achieved whereby the downsizing of a total of a product can be performed and cost reduction can be achieved.

In this case, the solenoid valve of the seventh invention can adopt the following embodiments. According to a solenoid valve of a first embodiment, the first stroke is set to a stroke at a lower limit of the pressure of use. Further, according to a second embodiment of a solenoid valve, the thickness of the film of the diaphragm (3) is set to approximately 0.4 mm or less and a hardness of rubber of the film is set to approximately 80 degrees or less.

The solenoid valve of the first embodiment can be used extremely practically and the solenoid valve of the second embodiment can easily provide the above-described particular property by adjusting the film thickness and the hardness.

Furthermore, according to a solenoid valve of a third embodiment, there is provided the solenoid valve;

wherein the pilot valve hole (31) is installed at central portion of the diaphragm (3), the bleed hole (32) is installed at a position adjacent to the pilot valve hole (31) and a rectifying cone (7) having a shape where a peripheral face is smoothly squeezed toward a direction of flowing a fluid is formed around the pilot valve hole (31).

According to the solenoid valve of the third embodiment, the channel resistance in passing a fluid along the rectifying cone can be reduced and particularly, reduction in a flow rate at low pressure can be prevented as less as possible.

Further, according to a solenoid of a fourth embodiment, there is provided the solenoid valve according to the above embodiment;

wherein a length of the rectifying cone (7) is substantially equal to a length of a maximum stroke of the diaphragm.

According to the solenoid valve of the fourth embodiment, a turbulent flow of a fluid in passing the rectifying cone is restrained from causing and the rectifying cone per se can be restrained from becoming unpreparedly a resistance of the fluid through optimizing the length of the rectifying cone. Therefore, a proper flow rate can firmly be provided.

According to a solenoid valve of an eighth invention, there is provided a solenoid valve comprising a diaphragm (3) having a pilot valve hole (31) and a bleed hole (32) and a pin (33) penetrating through a bleed hole (32) where a main valve hole (63) is opened and closed by opening and closing the pilot valve hole (31) by a movement operation of a plunger (15) of a solenoid (B), characterized in that:

a strainer is installed on a primary side of water supply of the solenoid valve, and a sectional area of a gap between the bleed hole (32) and the pin (33) is fixed to be substantially equal to or larger than a mesh of the strainer.

According to the solenoid valve of the eighth invention, dirt or the like which has passed through the mesh of the strainer installed on the primary side of the water supply, can pass through the clearance between the bleed hole and the cleaning pin in accordance with the relationship between the sectional area of the clearance between the bleed hole of the cleaning pin and the area of the mesh of the strainer. Therefore, clogging of dirt or the like at the clearance is avoided whereby water is made to flow smoothly into the inside of the bleed hole and therefore, the operational pressure of the diaphragm can firmly be provided and the durability can be promoted.

BEST MODE FOR CARRYING OUT INVENTION

An explanation will be given of embodiments of the present invention in reference to the drawings as follows.

Figure 1A:
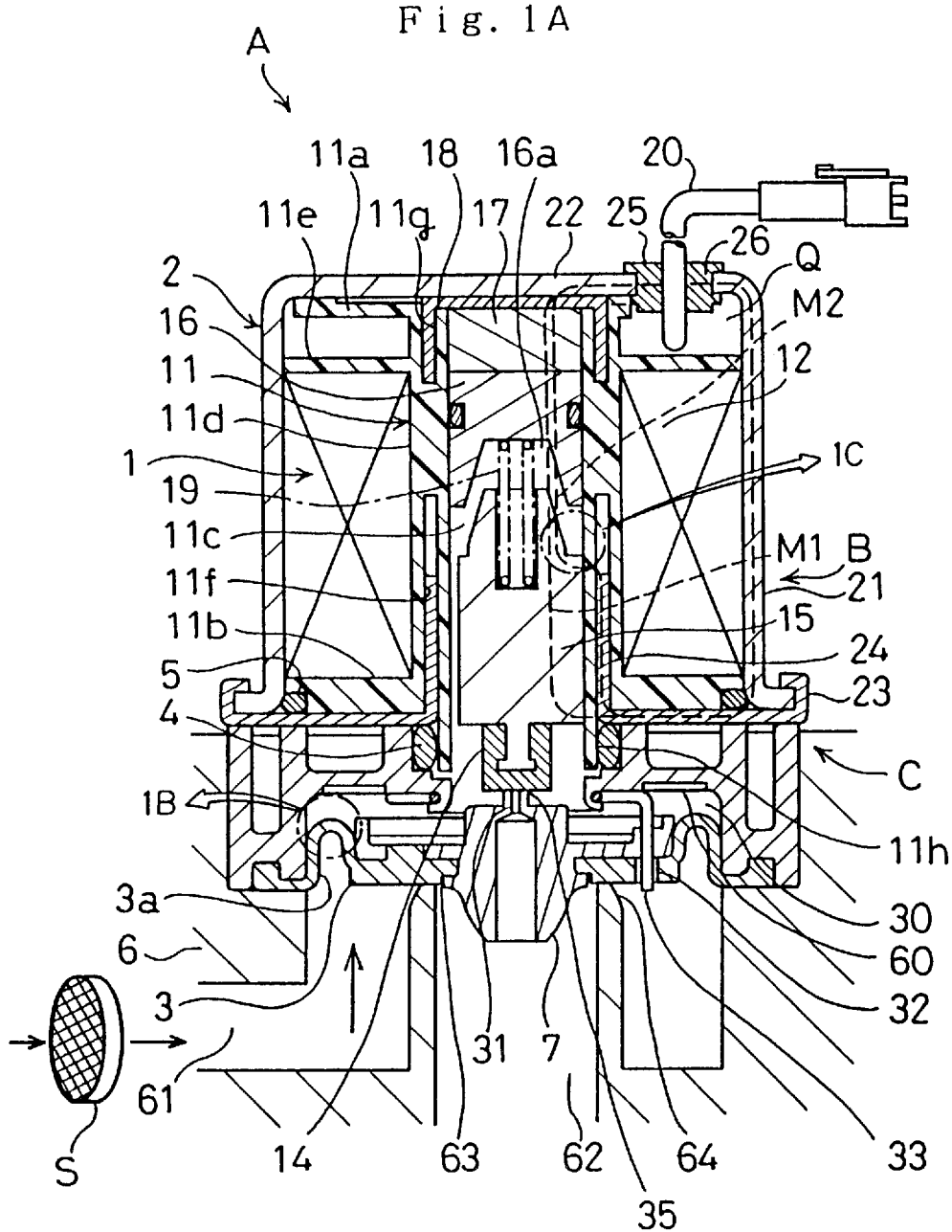
FIG. 1 is an explanatory view showing an inner structure of a solenoid valve according to the present invention.
Figure 1B:
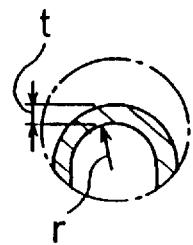
Figure 1C:
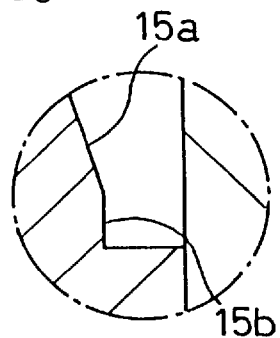

FIG. 1 is an explanatory view showing an inner structure of a solenoid valve A provided with a solenoid B according to the present invention where a valve closing state in which a plunger 15, mentioned later, is projected as shown.

The solenoid valve A has a solenoid B and a diaphragm valve C. An explanation will be firstly given of the solenoid B.

As shown by FIG. 1, the solenoid B has an electromagnetic coil 1 and a yoke 2 surrounding it. The electromagnetic coil 1 has a cylindrical bobbin 11 for forming a region for forming a coil winding at an external side thereof and a region of moving a plunger at an inner side and upper and lower ends of the bobbin 11 constitute an upper flange 11a and a lower flange 11b. A longitudinal hole 11c that is to constitute the area of moving the plunger 15 is formed at the central portion of the bobbin 11 and a coil winding 12 comprising copper wires is directly wound around a peripheral wall 11d thereof (region of forming coil winding). Therefore, when electricity is conducted in the electromagnetic coil 1, magnetic fluxes of a generated magnetic field penetrate the longitudinal hole 11c of the bobbin 11 in the axial direction and a magnetic force thereof is developed at the inside of the longitudinal hole 11c and the plunger 15 is magnetized by receiving the magnetic force.

Further, a partition flange 11e is formed below the upper flange 11a of the bobbin 11 with a space of a certain distance between the upper flange 11a and the partition flange 11e. Also, the space between the partition flange 11e and the upper flange 11a surrounded by the yoke 2 constitutes a coil winding end treating space Q.

The coil winding end treating space Q is a space for drawing an winding end 20 of the coil winding 12 to the outside and as illustrated, the coil winding 12 is not wound in the space. Further, the winding end 20 is drawn to the outside via an opening 26 perforated at the upper end face of the yoke 2. The opening 26 is closed by a rubber bush 25 tightly fitted to the winding end 20. Accordingly, it is not necessary to perform resin molding at the drawing portion of the coil winding 12 and the total periphery of the electromagnetic coil 1 as in the conventional case whereby a volume of a wound portion of the coil winding 12, that is, the volume of the electromagnetic coil 1 per se is downsized.

Incidentally, as a sealing means, instead of using the above-described rubber bush 25, resin may be flowed from the opening 26 and only the coil winding end treating space Q may be subjected to the above-described resin molding.

Further, the yoke 2 is provided with an outer peripheral side plate 21 covering the outer periphery of the electromagnetic coil 1, an upper end plate 22 and a lower end plate 23 both of which are made of iron, provided with a substantially circular form. In this case, the yoke 2 having the lower end plate 23 may not be made of iron so far as the material is constructed of a magnetic body. Incidentally, the lower end plate 23 is mounted on the upper face of a pressure chamber forming plate 60 of the diaphragm valve C, mentioned later.

Further, the yoke 2 has a cylindrical projection 24 for forming an irregular magnetic field to dispose between the above-described upper end plate 22 and the lower end plate 23. The projection 24 is raised upwardly from the surrounding of an opening installed at the central portion of the lower end plate 23 and is integrally formed with the lower end plate 23 and is provided with a property bearing magnetism since the lower end plate 23 is made of iron. That is, the projection 24 comprises a magnetic body. Further, the projection 24 surrounds the plunger 15 in the longitudinal hole 11c. And, when electricity is conducted in the electromagnetic coil 1, the projection 24 forms an irregular magnetic field whereby magnetic fluxes are developed from a top end thereof into the plunger 15. In this case, a raised height of the projection 24 is adjusted by a method of cutting or the like in accordance with the magnitude of the irregular magnetic field to be formed. Incidentally, a detailed description will be given later of a function of the cylindrical projection 24 for forming the irregular magnetic field. Also, the projection 24 may not be formed in a cylindrical shape but portions thereof may be projected upwardly. Also, it may be formed integrally with the bobbin 11 by insert molding or the like.

Such a cylindrical projection 24 for forming an irregular magnetic field, is fitted into a recess 11f provided to surround the periphery of the longitudinal hole 11c at a lower portion of the peripheral wall 11d of the bobbin 11 that is formed rather thick. As illustrated by FIG. 1, the recess 11f is for fitting the projection 24 and is previously formed deeply such that the raised height does not hinder fitting of the projection 24 the raised height of which is adjusted as described above. Also, an inner diameter side end portion of the peripheral wall 11d constitutes a projection 11h extending downward from the lower end plate 23 of the yoke 2.

The electromagnetic coil 1 is arranged at the inside of the longitudinal hole 11c with the plunger 15, a pole core 16 and a permanent magnet 17 in this order, from a lower end side thereof. The plunger 15 has a valve 14 at its lower end and is capable of moving abrasively at the inside of the longitudinal hole 11c. Further, the permanent magnet 17 and the pole core 16 are respectively fixed to the inside of the longitudinal hole 11c such that the permanent magnet 17 is disposed above the pole core 16.

The permanent magnet 17 according to the embodiment is formed by using a magnet made of rare earth elements of neodymium-iron-boron, samarium-cobalt or the like having a large coercive force. The permanent magnet 17 is a magnet smaller than a conventional one since a sufficiently strong magnetic field can be formed thereby even if the volume is decreased. Incidentally, the permanent magnet 17 may be a magnet using rare earth metals, specifically, a plastic magnet whose major component is neodymium-iron-boron, samarium-cobalt or the like.

When the permanent magnet 17 is arranged at the top portion in this way, electromagnetic field formed by the electromagnetic coil 1 passes through the permanent magnet 17 and the plunger 15 is magnetized by the electromagnetic field. Also, a force applied on the plunger 15 by the permanent magnet 17 is inversely proportional to a distance between the plunger 15 and the permanent magnet 17. Hence, the electromagnetic field formed by conducting electricity to the electromagnetic coil 1 (opening electricity conduction) for sucking the plunger 15 at a position separated from the permanent magnet 17 to the side of the pole core 16, that is, in a direction of the opening side, is provided with a direction the same as that of the polarity of the permanent magnet 17. Conversely, the electromagnetic field formed by conducting electricity to the electromagnetic coil 1 (closing electricity conduction) for driving the plunger 15 at a latch position where it is sucked to the permanent magnet 17, to the side of separating it from the permanent magnet 17, that is, in a direction of the closing side, is provided with a direction reverse to that of the polarity of the permanent magnet 17. Then, it is necessary to magnetize the plunger 15 to provide the polarity reverse to that of the permanent magnet 17 in order to drive the plunger 15 at the latch position where it is sucked to the permanent magnet 17 in the direction of the closing side. Accordingly, in conducting to close the electromagnetic coil 1, an electromagnetic force considerably stronger than that in the case of the opening electricity conduction is necessary.

Hence, a cylindrical adjusting member 18 for adjusting the magnetism of the permanent magnet is arranged above the permanent magnet 17 and a magnetic circuit is constituted by the adjusting member 18 and the permanent magnet 17. Then, the magnetic field of the permanent magnet is dispersed by the magnetic circuit and fluxes passing from the permanent magnet 17 to the plunger 15 and the yoke 2 are diminished whereby the electromagnetic force necessary for moving the plunger 15 in the direction of the closing side is weakened. Incidentally, when the plunger 15 is separated from the permanent magnet 17 by conducting electricity in the electromagnetic coil 1, a strong electromagnetic force is necessary as described above. However, when the plunger 15 is separated from the permanent magnet 17, the force exerted on the plunger 15 by the permanent magnet 17 is decreased as the plunger 15 become further from permanent magnet 17, the strong electromagnetic force is not always necessary in subjecting the electromagnetic coil 1 to the closing electricity conduction.

The adjusting member 18 according to the embodiment is formed in a cylindrical shape and is fitted to the inside of an upper recess 11g provided in a ring-like shape at the upper portion of the peripheral wall 11d of the bobbin 11. However, the shape is not limited to the cylindrical shape but it may be a shape where portions of the adjusting member is projected to the side of the periphery of the permanent magnet 17. Incidentally, the upper recess 11g is formed to surround the longitudinal hole 11c substantially similar to the above-described recess 11f.

Further, downsizing of the solenoid B is achieved by providing the plunger 15 of the embodiment with a small diameter in correspondence with a necessary magnetizing force. Therefore, the self weight of the plunger 15 is decreased and the frictional force is reduced by which a suction efficiency of the magnetic force is promoted.

Moreover, a hem of a taper portion 15a sucked to a recess 16a of the pole core 16 constitutes a vertical portion 15b that is vertically formed. It has been experimentally confirmed that the suction efficiency of the plunger 15 is promoted by forming such a vertical portion 15b. Accordingly, the initial sucking force applied on the plunger 15 is enhanced whereby the magnetic efficiency is significantly promoted in addition to downsizing the plunger 15.

A return spring 19 is arranged between the plunger 15 and the pole core 16. By such a constitution the plunger 15 receives an elastic force of the return spring 19 and is disposed at the closing position as illustrated by FIG. 1 in an initial state (or when water is cut off) where electricity is not conducted in the electromagnetic coil 1. The valve 14 installed at the lower end of the plunger 15 closes a pilot valve hole 31 installed at the central portion of the diaphragm 3 of a diaphragm valve C.

Further, a relationship between the spring force of the return spring 19 and the suction force of the permanent magnet 17 is determined as follows. That is, when the plunger 15 is naturally dropped from a position where the plunger 15 is sucked to the pole core 16 (opening side position), the plunger 15 is bounded by a valve seat 35 formed at the peripheral edge of the pilot valve hole 31. When the plunger 15 reaches an upper limit position (highest arrivable position) in bounding it, a separating force larger than the suction force of the permanent magnet 17 is set to exert on the plunger 15 by the return spring 19.

In mounting the solenoid B to the diaphragm valve C, mentioned later, the lower end plate 23 of the yoke 2 is placed above the upper face of the pressure chamber forming plate 60. Incidentally, waterproof of the electromagnetic coil 1 inside of the yoke 2 is achieved by a packing 4 disposed between the projection portion 11h and the pressure chamber forming plate 60 and an O-ring 5 disposed between the lower flange 11b of the bobbin 11 and the peripheral side plate 21 of the yoke 2. Accordingly, the solenoid B according to the present invention is waterproofed by a simple structure.

Further, it is excellent in view of the magnetic efficiency to provide the peripheral side plate 21 of the yoke 2 over the entire peripheral region surrounding the electromagnetic coil 1 as described above. Specifically, it has been experimentally confirmed that the magnetic efficiency of the electromagnetic coil 1 having the yoke 2 according to the embodiment is promoted by about 15% compared with a coil having a yoke with a section in a channel-like shape where the peripheral side plate 21 is bonded only to portions of the upper end plate 22 and the lower end plate 23.

Next, an explanation will be given of the diaphragm valve C.

As shown by FIG. 1, the diaphragm valve C has a valve box 6 and the valve box 6 has a flow-in path 61 and a flow-out path 62 communicated and connected respectively with a primary pipe and a secondary pipe.

A strainer S having a filter in a mesh-like shape is arranged in the midway of the flow-in path 61. Hence, foreign objects in supplied water that are larger than the mesh are removed here and are not flowed into the diaphragm valve C.

Further, a main valve hole 63 is formed between the flow-in path 61 and the flow-out path 62 in the valve box 6 and the peripheral edge of the opening at the upper end of the main valve hole 63 constitutes a main valve seat 64. Also, the diaphragm 3 which also serves as a main valve for opening and closing the main valve hole 63, is attachably and detachably arranged at the main valve seat 64. Incidentally, a seat 3b of the diaphragm 3 is attached to and detached from the main valve seat 64.

In respect of the diaphragm 3, the radius r at a bent portion of a membrane 3a is set to as small as 3 mm or less, an operational effective diameter is increased and a film thickness t is set to as thin as 0.4 mm or less. Further, the hardness of rubber forming the membrane is set to 80 degree or less by which the diaphragm 3 is provided with the high sensitivity in respect of pressure and influence of hysteresis is made as small as possible.

Figure 4:
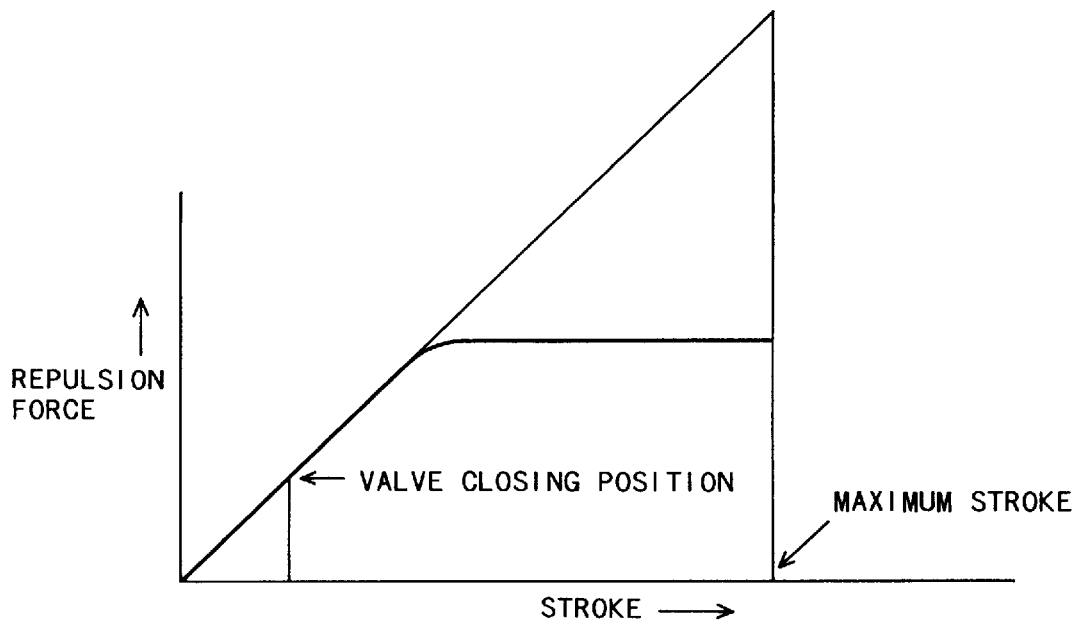
FIG. 4 is a characteristic diagram of a diaphragm.

That is, as shown by FIG. 4, the diaphragm 3 achieves a characteristic where the reaction force is increased in accordance with the stroke when it is operated at a low stroke, whereas the reaction force is maintained constant when it is operated at a high stroke. Thereby, the water cut-off capability and the valve opening capability are not deteriorated even at the low pressure (0.3 kg/cm$^2$) and the diaphragm moves to the opening position illustrated by FIG. instantly even at the low pressure (0.3 kg/cm$^2$) by which the necessary flow rate can firmly be provided.

In the meantime, to maintain the water cut-off state, a little reaction force is necessary in the diaphragm 3 even if the diaphragm is closed. According to a conventional diaphragm, it has a reaction force characteristic in accordance with the stroke up to a maximum stroke and therefore, the reaction force at the maximum stroke is intensified. Therefore, a large diameter is necessary to operate a diaphragm by a low differential pressure. However, according to the diaphragm having the above-described characteristic in this embodiment, even at the maximum stroke, a small constant reaction force similar to the case of a stroke smaller than the maximum stroke is necessary while exerting the reaction force necessary for maintaining the water cut-off state. Therefore, the diameter of the diaphragm can be decreased.

A diaphragm pressure chamber 30 substantially surrounded by the diaphragm and the pressure chamber forming plate 60 is formed above the diaphragm 3. Further, the diaphragm pressure chamber 30 communicates with the flow-out path 62 via the pilot valve hole 31 installed at the center of the diaphragm 3 and a bleed hole 32 installed at the peripheral edge of the diaphragm 3.

The valve 14 provided at the top end of the plunger 15 of the solenoid B is arranged opposite to and above the pilot valve hole 31 as described above. The pilot valve hole 31 is opened and closed by extracting and detracting movements of the plunger 15 as mentioned above. In this case, in opening the valve, even if the plunger 15 is bounded by the valve seat 35 of the pilot valve hole 31 and is disposed at the upper limit position, the plunger receives the separating force of the return spring 19 surpassing the suction force of the permanent magnet 17 by which the plunger 15 is firmly driven to the valve closing side, as has been explained. Therefore, the diaphragm valve C can be closed by firmly closing the pilot valve hole 31.

Further, a cleaning pin 33 penetrating the bleed hole 32 is attachably and detachably installed to the lower end of the pressure forming plate 60 opposed to the diaphragm 3. Therefore, in the case where the cleaning pin 33 is bent or the like, the cleaning pin 33 can easily be exchanged by removing the diaphragm 3. Incidentally, the cleaning pin 33 removes scale adhered at the surrounding of the bleed hole by the upward and downward motion of the diaphragm.

The bleed hole 32 constitutes a bleed hole substantially having a donut-like shape since the cleaning pin 33 is arranged to penetrate the bleed hole 32. Therefore, the channel resistance when water passes through the bleed hole 32 can be increased and accordingly, the path flow rate can be restrained compared with that in the case of a circular bleed hole perforated with the same sectional area. Therefore, the water power in closing the diaphragm 3 is alleviated.

Moreover, a sectional area of a clearance between the bleed hole 32 and the cleaning 33 is set to be substantially equal to or larger than the mesh area of the strainer S installed at the midway of the flow-in path 61. Therefore, very small dirt or the like which has passed through the strainer S is not clogged by the bleed hole 32 and water is smoothly flowed into the bleed hole 32.

Further, the outer periphery at the lower end of the pilot valve hole 31 constitutes a rectifying cone 7 having a peripheral face with a shape squeezed gradually smoothly toward the flow direction of fluid. The rectifying cone 7 is formed such that the channel resistance is made as small as possible and firmly provides the flow rate at a low pressure as described below.

Figure 5:
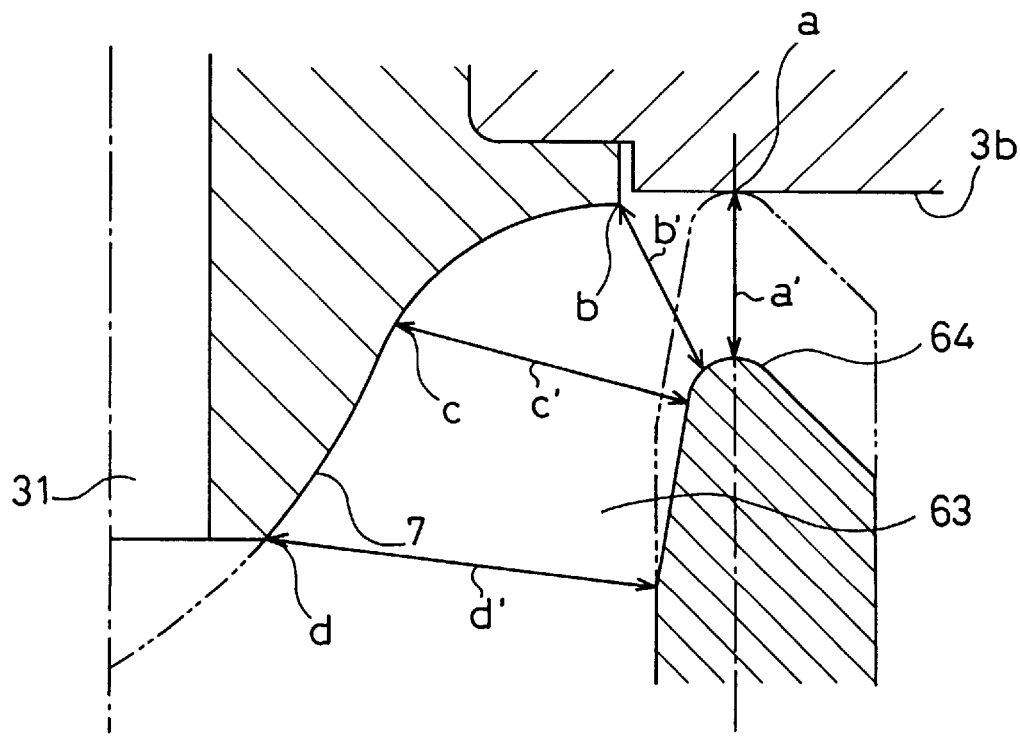
FIG. 5 is an explanatory view of a rectifying cone.
Figure 6:
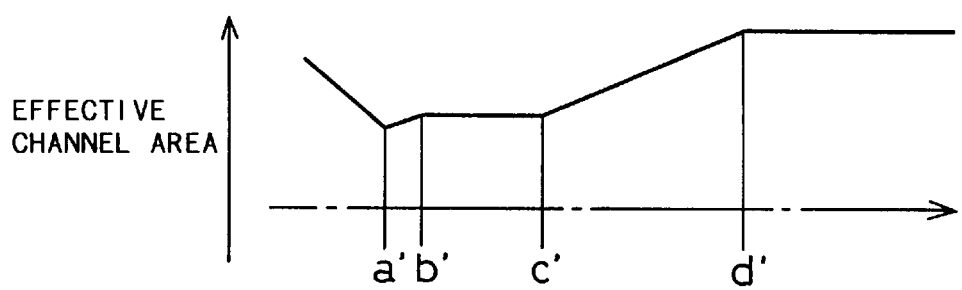
FIG. 6 is a graph showing changes in a flow path area at a peripheral face of the rectifying cone.

FIG. 5 shows the valve opening position at a low pressure (0.3 kg/cm$^2$) and the flow rate at such a low pressure can firmly be provided by smoothly converting the flow direction in the vicinity of the valve seat. For that purpose, as shown by FIG. 5, the rectifying cone 7 is provided at the secondary side (flow-out path side) of the valve. The effective channel area of the opening of the main valve hole 63 is changed as shown by FIG. 6. In this case, the ordinate of FIG. 6 designates the effective channel area. Also, the abscissa designates a separating distance between the rectifying cone 7 and the main valve seat 64 when the main valve seat 64 is disposed at a position illustrated by the solid line in FIG. 5 in respect of the seat 3b of the diaphragm 3. The outer peripheral shape of the rectifying cone 7 is formed such that at a portion between a flow path onset point a where the main valve seat 64 is brought into contact with the seat 3b (refer to FIG. 5, the same as follows) and a shape forming onset point b of the rectifying cone 7, a separating distance (a', b') between the rectifying cone 7 and the main valve seat 64, that is, the effective channel area is gradually enlarged, at a portion between the onset point b and a shape forming midway portion c of the rectifying cone 7, a separating distance (c') that is the effective channel area remains the same, and at a portion between the shape forming midway portion c and a shape forming peak point portion d, these separating distance (d') that is the effective channel area is gradually enlarged again.

By constituting such a shape, the guiding function of water flow is achieved and the pressure loss caused by contraction or vortex is diminished.

Further, the length of the rectifying cone 7 of the embodiment is substantially the same as the maximum stroke of the diaphragm 3, which is an experimentally proved optimum length in respect of the flow rate. That is, when the length of the rectifying cone 7 is excessively short, in flowing water into the main valve hole 63, portions of water immediately collide with each other causing a turbulent flow whereby the flow rate is diminished and a desired flow rate cannot be obtained. Also, when it is conversely excessively long, the rectifying cone 7 per se constitutes a resistance thereby diminishing the flow rate, which has been experimentally known.

The response of the diaphragm valve C is promoted by the above-described structure. Further, unstable operation at a low pressure is resolved and the cut-off capability and the valve opening capability can be kept excellently. Furthermore, water discharge function is promoted by the rectifying cone 7 and the diaphragm valve C can be downsized while maintaining the valve function.

Incidentally, the shape of the front edge of the main valve seat 64 in FIG. 5 is determined as follows. The pressure receiving diameter is contracted more than that in the conventional case by downsizing the diaphragm valve C. Further, in order to compensate for lowering a force of closing the diaphragm 3 with the small pressure receiving diameter, a radius of curvature of the front end of main valve seat is set to the radius of curvature (the curvature of this embodiment is 0.3 mm) smaller than the conventional radius of curvature (about 0.5 mm). However, the front end of the main valve seat having such a small radius of curvature, provides a bite of the front end in respect of the seat 3b of the diaphragm 3 whereby a local stress is imposed on the diaphragm 3. Therefore, the durability is deteriorated in the case of simply decreasing the radius of curvature. Therefore, according to the embodiment, not only the radius of curvature is simply decreased but a hem portion of the front end of the main valve seat 64 is tapered even at the second side of water supply to achieve dispersion of stress by increasing the surface area of a subsiding portion of the seat 3b caused by the bite even if the front end of the main valve seat bites the seat 3b in closing the diaphragm valve C. By tapering the hem portion in this way the durability of the diaphragm 3 is ensured through the dispersion of stress. Also, the laminar flow function is promoted by the tapered face along with the above-described rectifying cone 7 which prevents a discharge amount from decreasing.

Further, an extremely small-sized solenoid valve A can be provided by combining the diaphragm valve with the solenoid B achieving the above-mentioned downsizing.

Next, an explanation will be given of the operation of the solenoid valve A according to the embodiment in reference to FIG. 1 through FIG. 3 and FIG. 8 as follows.

First, an explanation will be given of the operation of driving the solenoid valve A in the closed state as illustrated by FIG. 1 into the opening state.

Figure 2:
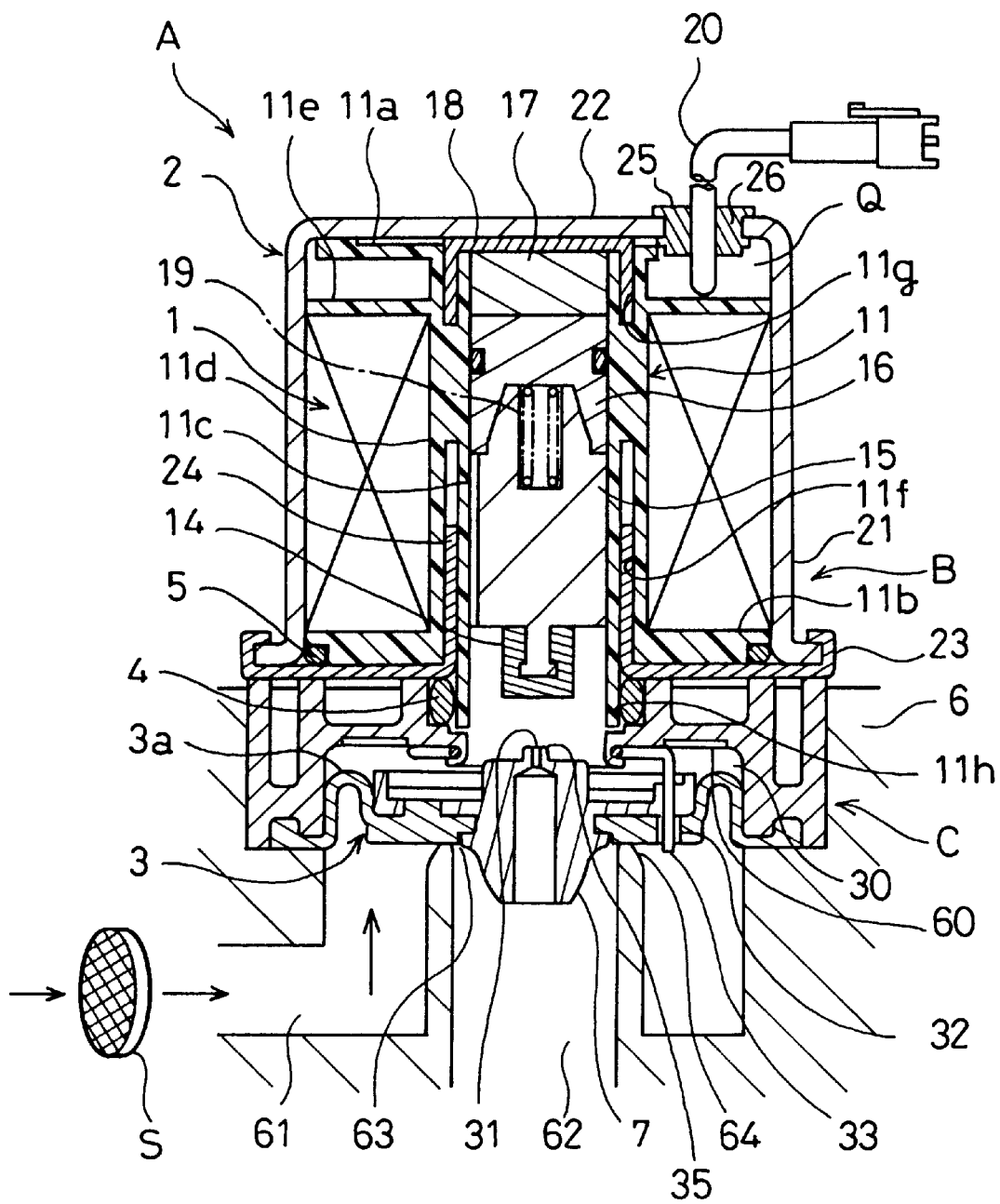
FIG. 2 is an explanatory view of an operational state of the solenoid valve.

When electricity is conducted to the electromagnetic coil 1 to drive the plunger 15 to the opening position, as shown by FIG. 1, a main magnetic field M1 developing a magnetic force to the inside of the longitudinal hole 11c of the bobbin 11 is generated by the electromagnetic coil 1. Further, in addition to the main magnetic field M1, an irregular magnetic field M2 is generated. The irregular magnetic field M2 is generated with the projection 24 that is the magnetic body as a portion of a magnetic flux path and the magnetic flux is formed from the side of the base of the projection 24, that is, the side of the lower endplate 23 of the yoke 2 along the top end side of the projection 24 and reaches the plunger 15 inside of the longitudinal hole 11c from the top end of the projection 24. Therefore, the irregular magnetic field M2 develops the magnetic force from the top end of the projection 24 to the plunger 15. Accordingly, as shown by FIG. 2, the plunger 15 receiving the magnetic force of the main magnetic field M1 and the irregular magnetic field M2, is sucked to the pole core 16. In this way, the magnetic efficiency in driving the plunger 15 to the sucking side is promoted by the irregular magnetic field M2 and therefore, there is no hindrance in the sucking operation of the plunger 15 even if the turn number of the coil winding 12 in the electromagnetic coil 1 is decreased. Therefore, the downsizing of the solenoid B can be achieved through the reduction in the turn number of the coil winding 12 and no adverse influence is effected in the extracting and detracting operation of the plunger 15 even with the small-sized solenoid B.

Figure 7:
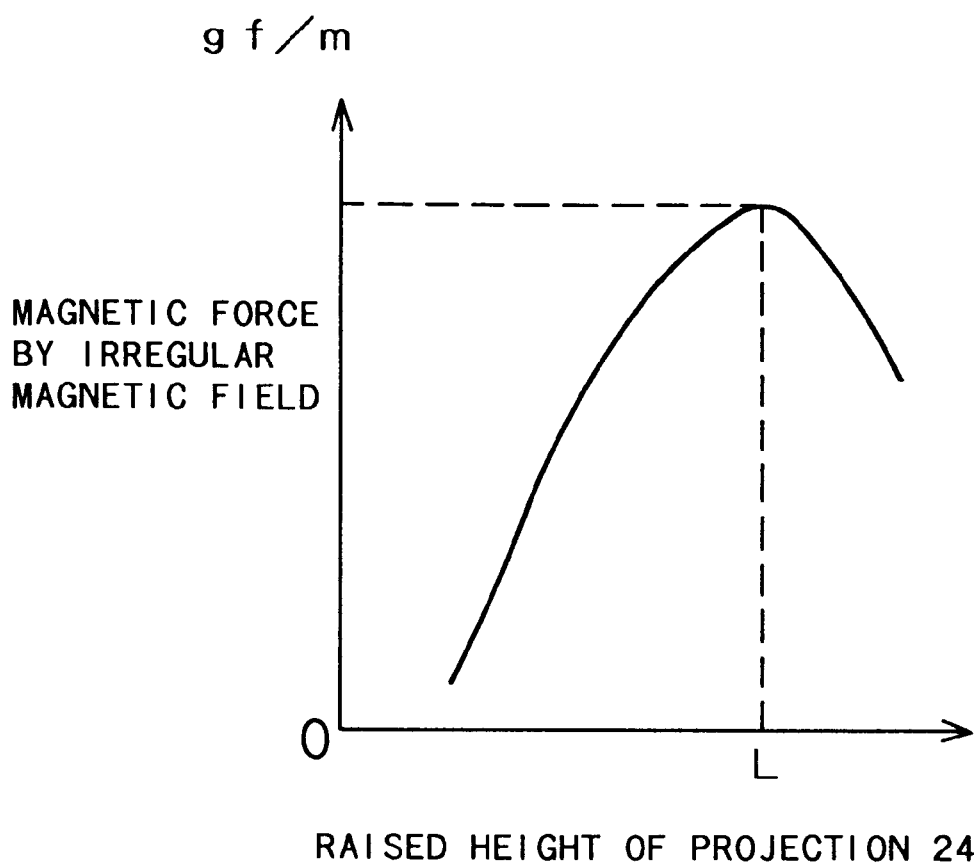
FIG. 7 is a graph showing a relationship between the magnitude of magnetic force of an irregular magnetic field M2 exerted on a plunger 15 from a top end of a projection 24 for forming the irregular magnetic field and a raised height of the projection 24.

Moreover, in fitting the projection 24 into the recess 11f of the peripheral wall 11d, the raised height is previously adjusted. Therefore, the following advantage is resulted. That is, as shown by FIG. 7, the magnitude of the magnetic force of the irregular magnetic field M2 developing from the top end of the projection 24 for forming the irregular magnetic field to the plunger 15, is varied by the positional relationship between the projection 24 and the plunger 15, that is, the raised height of the projection 24 and the magnetic force is maximized when the raised height falls at a certain value L. Therefore, when the projection 24 is fitted into the recess 11f after previously adjusting the raised height to be set to L, the magnetic force of the irregular magnetic field M2 can most efficiently be exerted on the plunger 15 by the maximum magnetic force. Therefore, compared with the case where the projection 24 is simply fitted to the recess 11f, the turn number of the coil winding 12 can be decreased and therefore, the solenoid B can further be downsized through the downsizing of the coil winding 12 per se.

Figure 8:
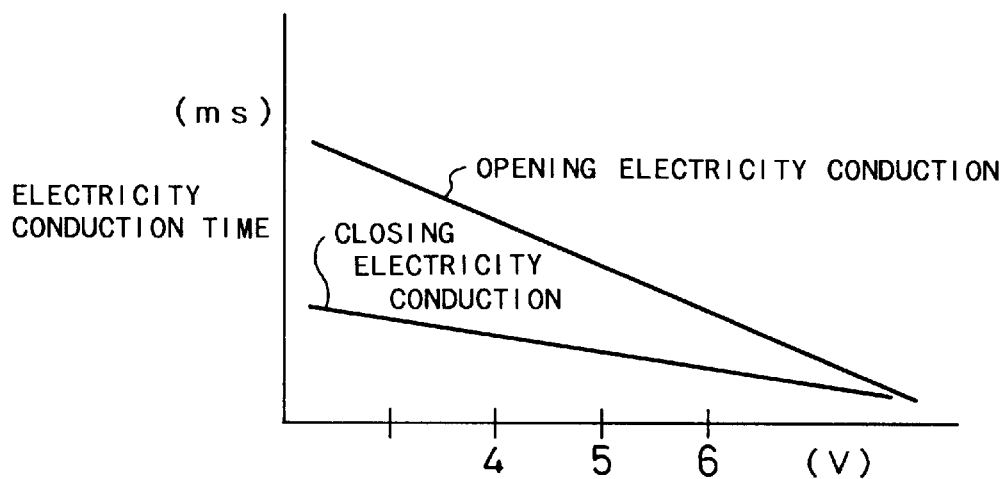
FIG. 8 is a graph showing a battery voltage and changes in an electricity conduction time period of a solenoid.

Meanwhile, the solenoid valve A according to the embodiment is driven by a battery and as shown by FIG. 8, the electricity conduction time period in respect of the solenoid B is varied by the battery voltage. Explaining more in details, in the opening electricity conduction for driving the plunger 15 against the return spring 19, the electricity conduction time period is prolonged than that in the closing electricity conduction and further, the lower the battery voltage, the longer the electricity conduction time period in the respective electricity conduction. Accordingly, the battery can be provided with a long life and the frequency of exchanging the battery is diminished since discharge from the battery is not required more than necessary.

Figure 9:
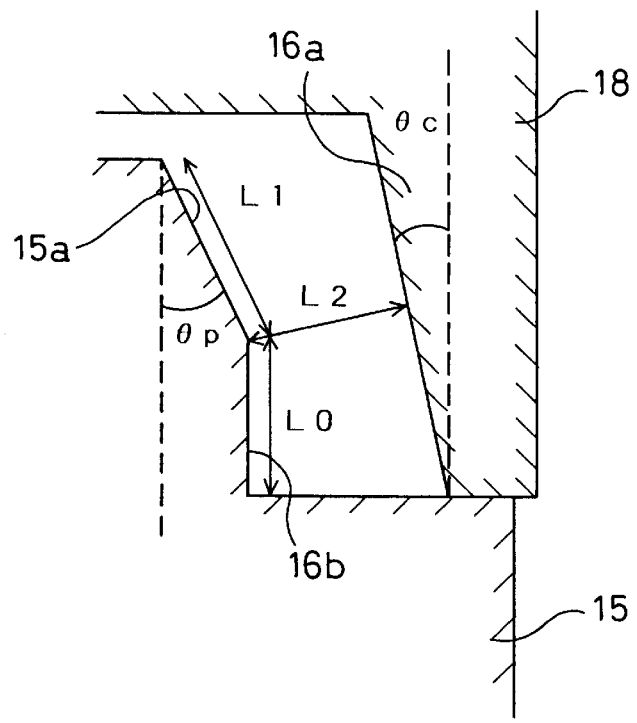
FIG. 9 is an explanatory view of the plunger of the solenoid valve according to the present invention.

Further, as shown by FIG. 9, the plunger 15 is provided with a vertical portion 15b and further, a taper angle θp of a tapered portion 15a of the plunger and a taper angle θc of a recess 16a of the pole core are set to a relationship of θp>θc. Therefore, the suction force of the plunger 15 can be increased compared with that having no such vertical portion. Specifically, an experiment has been conducted in respect of influence effected on the suction force where the necessary stroke was set to 2.5 mm, θp=15°, θc=13.5°, the shortest distance L2 between the plunger 15 and the pole core 16 was set to 0.432 mm and a length L0 of the vertical portion 15b was made variable in a range of zero through 1.4 mm. As a result, the suction force was increased by about 8% in the case of L0=1.4 mm compared with that in the case of providing no vertical portion.

Figure 10:
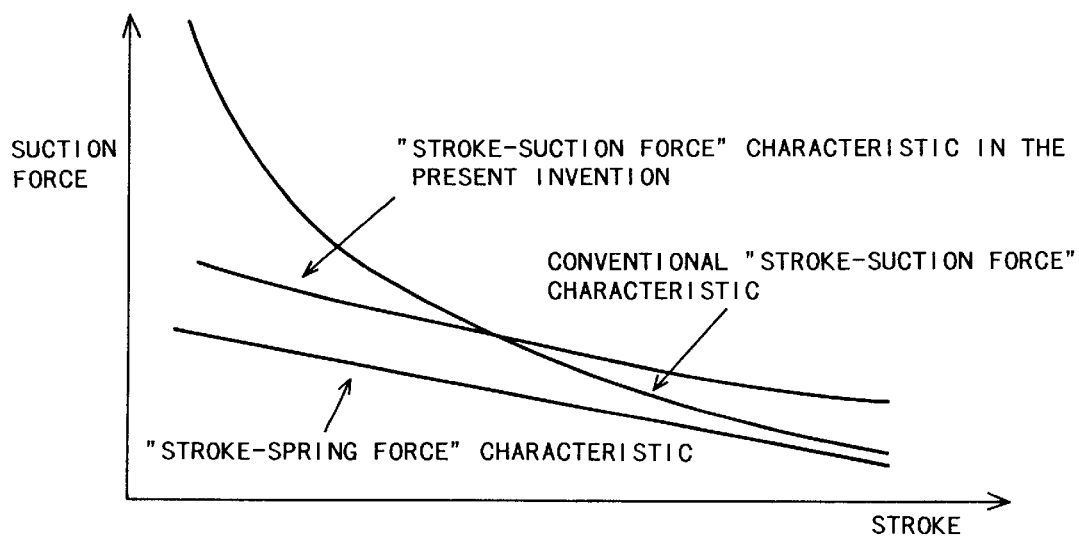
FIG. 10 is a graph showing suction force characteristics of the solenoid according to the present invention.

Incidentally, when the shortest length L2 is comparatively increased, a linear "stroke-suction force" characteristic as shown by FIG. 10 is obtained by providing the length L0 of the vertical portion 15b in this way. According to the characteristic, although the suction force when the plunger 15 gets near to the pole core 16 is diminished, the plunger 15 is normally sucked to the pole core by inertia at that position and therefore, the large suction force by the electromagnetic coil is not always necessary. Therefore, no particular problem is resulted even with the above-described linear characteristic.

Conversely, according to the conventional one, when the plunger 15 is sucked to the pole core 16, the nearer the plunger 15 approaches the latch position, the larger the difference between the suction force and the spring force (substantial suction force) whereby an impact sound derived from collision of metals is generated. However, by providing the "stroke-suction force" characteristic as illustrated by FIG. 10, the generation of the impact sound in latching is restrained as small as possible.

Therefore, a quiet operation can be carried out without providing separately a buffer or the like. Incidentally, the above-described effect may be provided by adjusting the spring force in stepless or in multiple steps by using a conical spring or a multiple spring in the return spring 19.

As mentioned above, according to the embodiment, the vertical portion 15b is formed at the hem of the tapered portion 15a of the plunger 15, whereby the initial sucking force can be increased since the clearance between the hem and the pole core 16 can be shortened by the vertical portion 15b compared with that in the case where the vertical portion 15b is not provided.

Figure 3:
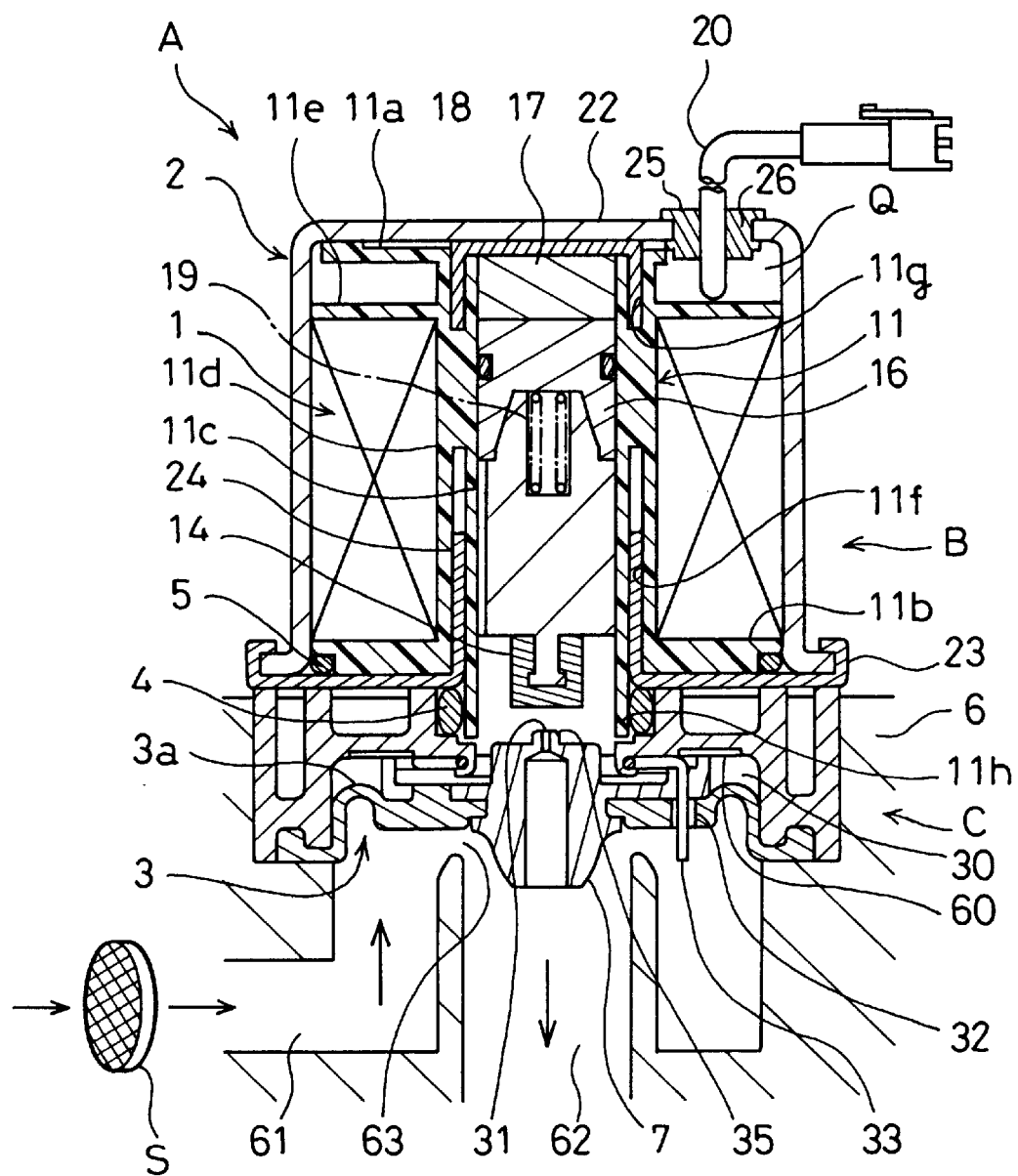
FIG. 3 is an explanatory view of an operational state of the solenoid valve.

As described above, when the plunger 15 is driven to suck, the valve 14 leaves the pilot valve hole 31 by which the pilot valve hole 31 is opened and the diaphragm pressure chamber 30 and the flow-out path 62 are communicated with each other. The hydraulic pressure in the diaphragm pressure chamber 30 is decreased by flowing water out to the flow-out path 62 and therefore, there causes a pressure difference between the hydraulic pressure in the diaphragm pressure chamber 30 and the hydraulic pressure in the flow-in path 61 whereby the diaphragm 3 is raised as shown by FIG. 3. Thereby, the diaphragm 3 leaves the main valve seat 64, the flow-in path 61 and the flow-out path 62 directly communicate with each other via the main valve hole 63 and water is passed from the primary side to the secondary side.

In this case, it is sufficient that the electromagnetic force operates only by the stroke of the plunger 15 and after the movement of the plunger 15, the plunger 15 is sucked to the pole core 16 by the magnetic force of the permanent magnet 17 and latched there. Thereby, the diaphragm valve C can maintain the opening state. Accordingly, after latching the plunger 15, the electricity conduction to the electromagnetic coil 1 is not necessary.

Next, an explanation will be given of an operation where the solenoid valve A in the opening state as illustrated by FIG. 3 is brought into the closing state illustrated by FIG. 1.

When electricity is conducted to the electromagnetic coil 1 in the direction of releasing the latch of the plunger 15, the plunger 15 is magnetized in a polarity reverse to the polarity of the permanent magnet 17 and the magnetic force received by the plunger 15 from the permanent magnet 17 is canceled by the magnetic force of the electromagnetic coil 1. Therefore, the plunger 15 smoothly falls down by the operation of the return spring 19 and closes the pilot valve hole 31 of the diaphragm 3. Thereby, the diaphragm 3 starts falling down.

At this moment, the amount of flow of water into the diaphragm pressure chamber 30 is gradually diminished by making the shape of the cleaning pin 33 in a tapered form owing to the squeezing effect provided by the pin. Therefore, the falling speed of the diaphragm 3 is retarded as it falls down and the main valve hole 63 is closed further moderately compared with that in the case where it is not formed in a tapered shape.

As described above, according to the embodiment, the operation is smooth and the desired flow amount can be obtained despite the downsizing of the solenoid valve A.

In the meantime, according to the embodiment, the self weight of the plunger 15 is decreased by providing the plunger 15 with a small size in accordance with a necessary magnetizing force in order to achieve the downsizing of the solenoid B and the suction efficiency of the magnetic force is promoted by reducing the frictional force. Here, an explanation will be given of the design of the plunger 15.

Figure 11:
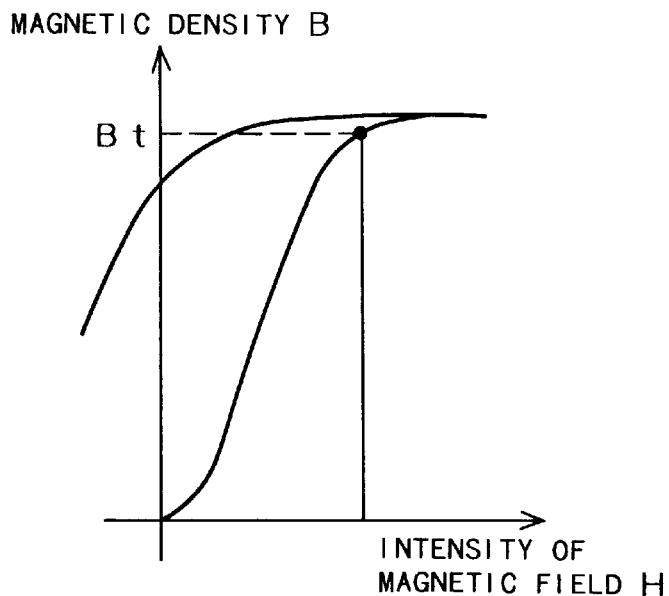
FIG. 11 is a graph showing a magnetic property of a magnetic body.

As is apparent from FIG. 11 showing the magnetic property of a magnetic body, when it is operated in a region having a linearity, the efficiency of using magnetic energy is excellent. However, when the linearity is lost by exceeding a certain magnetic flux density Bt and the magnetic field is further intensified, the magnetism is finally saturated and the energy efficiency is deteriorated.

Figure 12:
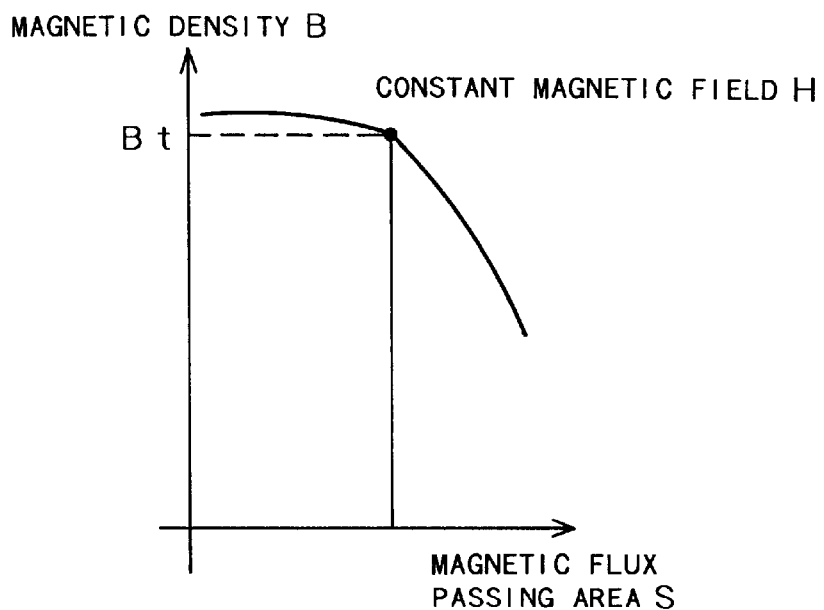
FIG. 12 is a graph showing a relationship between a magnetic flux passing area and a saturation point of a magnetic flux density.

Also, as apparent from FIG. 12 showing a relationship between a magnetic flux passing area and the saturation point of the magnetic density, when the passing area S of the magnetic flux is decreased while maintaining constant the magnetic field, the magnetic density is necessarily increased and similarly starts saturating at Bt. Further, when the passing area S of the magnetic fluxes is increased further, a total amount of magnetic flux (Bt·S) is decreased thereby and at the same time the suction force is also decreased.

Accordingly, it is known to design the plunger in a range where the magnetic flux density does not exceed the above-described Bt in order to achieve the downsizing efficiently.

The present invention has paid attention to the above-described point and sought a limitation whereby a plunger can be downsized efficiently in respect of the plunger having a longitudinal hole for inserting the return spring inside of the plunger. Further, the relationship between a minimum sectional area SpMIN of the plunger and a minimum radius r1MIN of the plunger in respect of a radius r2 of a longitudinal hole for spring at the limitation, has been sought and these values are determined to magnitudes of the both minima or larger.

Figure 13:
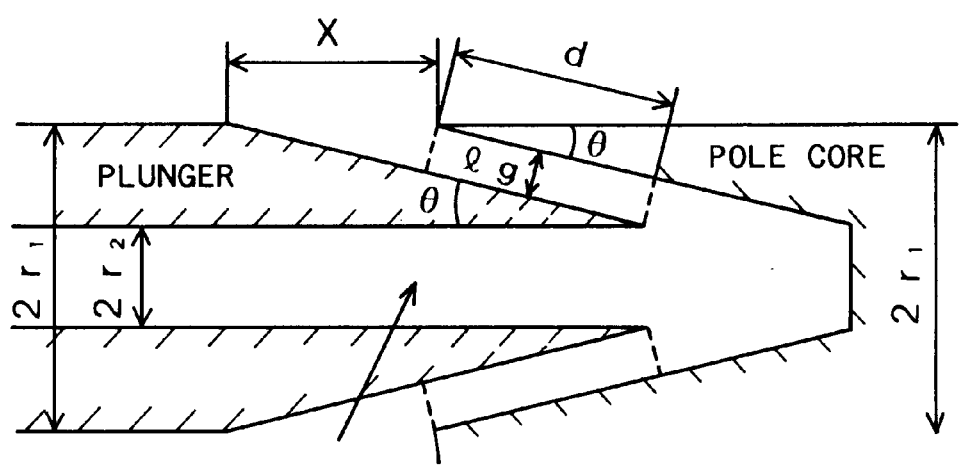
FIG. 13 is a sectional view of the plunger and a pole core.

A further detailed explanation will be given as follows. FIG. 13 is a schematic sectional view of a plunger and a pole core and notations in the drawing are as follows.

X : Stroke
1g : Shortest distance between plunger and pole core
d : Length along inclined face of overlapped portion
r1 : Radii of plunger and pole core
r2 : Radius of longitudinal hole for spring
θ : Taper angle of inclined face of plunger
Sga : Mean area of overlapped portion
Sp : Sectional area of plunger F : Suction force Here, the shortest distance between the plunger and the pole core 1g and the length d along an inclined face of an inclined overlapped portion are expressed by the following Equation 1 and Equation 2.

$$1g = x \sin \theta \qquad \text{Equation 1}$$

$$d = \frac{r1 - r2}{\sin \theta} - x \cos \theta \qquad \text{Equation 2}$$

Further, putting an overlapped area on the side of the plunger as Sg1 and an overlapped area on the side of the pole core as Sg2, the both overlapped areas Sg1 and Sg2 are expressed by the following Equation 3 and Equation 4.

$$Sg1 = \pi d\{r1 + (r1 - d \sin \theta)\} \qquad \text{Equation 3}$$
$$= \pi d(2r1 - d \sin \theta)$$

$$Sg2 = \pi d\{r2 + (r2 + d \sin \theta)\} \qquad \text{Equation 4}$$
$$= \pi d(2r2 + d \sin \theta)$$

Therefore, the mean area Sga of the overlapped portions are expressed by the following Equation 5 from Equation 3 and Equation 4.

$$Sga = \frac{1}{2}(Sg1 + Sg2) \qquad \text{Equation 5}$$
$$= \pi d(r1 + r2)$$

The sectional area Sp of the plunger is expressed by the following Equation 6.

$$Sp = \pi(r1^2 - r2^2) \qquad \text{Equation 6}$$

Further, designating the permanence (reciprocal number of magnetic resistance) of the overlapped portion as Pg, the following Equation 7 is obtained from Equation 1, Equation 2, Equation 5 and Equation 6.

$$Pg = \frac{\mu 0 Sga}{1g} = \frac{\mu 0 \pi d(r1 + r2)}{x \sin \theta} \left[ \frac{r1 - r2}{\sin \theta} - x \sin \right] \qquad \text{Equation 7}$$
$$= \frac{\mu 0 \pi (r1^2 - r2^2)}{x \sin \theta} - \frac{\mu 0 \pi (r1 + r2)}{\tan \theta}$$
$$= \frac{\mu 0 Sp}{x \sin 2\theta} - \frac{\mu 0 \pi (r1 + r2)}{\tan \theta}$$

Here, the suction force F is calculated and F is calculated as a function of a magnetizing force Ug in the gap and a change ratio of magnetic resistance dpg/dx.

In this case, putting the magnetic resistance in the gap as Rg and the magnetic flux density as Bg, the magnetizing force Ug is expressed by the following Equation 8.

$$Ug = RgBgSga = \frac{1g}{\mu 0 Sga} BgSga = \frac{1g Bg}{\mu 0} \qquad \text{Equation 8}$$

Meanwhile, the change ratio dpg/dx of the magnetic resistance is expressed by the following Equation 9 from Equation 7.

$$\frac{dPg}{dx} = -\frac{\mu 0 Sp}{x \sin 2\theta} = -\frac{\mu 0 Sp}{lg^2} \quad \text{Equation 9}$$

Therefore, the suction force F is expressed by Equation 10 from Equation 8 and Equation 9.

$$F = \frac{1}{2}Ug^2\frac{dPg}{dx} = \frac{1}{2}\frac{lg^2 Bg^2}{\mu 0^2}\left[-\frac{\mu 0 Sp}{lg^2}\right] \quad \text{Equation 10}$$
$$= -\frac{Bg^2 Sp}{2\mu 0}$$

Incidentally, the negative sign in Equation 10 expresses the suction force. Next, the minimum suction area SpMIN of the plunger where the magnetic flux starts saturating when a target suction force is designated by notation F0, is calculated. However, the calculation is carried out on the premise where the saturation occurs at the plunger portion prior to the overlapped portion and accordingly the calculation is carried out on the premise of a condition shown by the following Equation 11.

$$\frac{Sp}{Sga} \leq 1 \quad \text{Equation 11}$$

Equation 11 is modified into Equation 12 from Equation 5 and Equation 6.

$$\frac{Sp}{Sga} = \frac{\pi(r1^2 - r2^2)}{\pi d(r1 + r2)} = \frac{(r1 - r2)}{d} \leq 1 \quad \text{Equation 12}$$

In this case, the magnetic flux starts saturating at the plunger portion and therefore, the magnetic flux density there is Bt, in respect of the magnetic flux density of the overlapped portion, and the total amount of the magnetic flux remains the same and therefore, the magnetic flux density Bg is expressed by Equation 13.

$$Bg = Bt\frac{SpMIN}{Sga} \quad \text{Equation 13}$$

When Equation 12 is substituted for Equation 10, the target suction force F0 is shown by Equation 14.

$$F0 = \frac{Bt^2 SpMIN}{2\mu 0}\left[\frac{SpMIN}{Sga}\right]^2 \quad \text{Equation 14}$$

By rearranging Equation 14, the minimum sectional area SpMIN of the plunger when the downsizing is carried out efficiently at the target suction force F0 is obtained.

$$spMIN = \sqrt[3]{-\frac{2\mu 0 F0}{Bt^2}Sga^2} \quad \text{Equation 15}$$

Further, r1 takes a minimum value of r1MIN at the minimum sectional area SpMIN and therefore, a relationship of the minimum radius r1MIN of the plunger in respect of the radius r2 of the longitudinal hole for spring is determined from Equation 6.

$$\pi(r1MIN^2 - r2^2) = \sqrt[3]{-\frac{2\mu 0 F0}{Bt^2}Sga^2} \quad \text{Equation 16}$$

$$r1MIN = \sqrt{\frac{\sqrt[3]{-\frac{2\mu 0 F0}{Bt^2}Sga^2}}{\pi} + r2^2}$$

By calculating the minimum sectional area SpMIN of the plunger and a relationship of the minimum radius r1MIN in respect of the radius r2 of the longitudinal hole for spring in this way, the magnitude of the plunger 15 according to the embodiment is determined.

Figure 14:
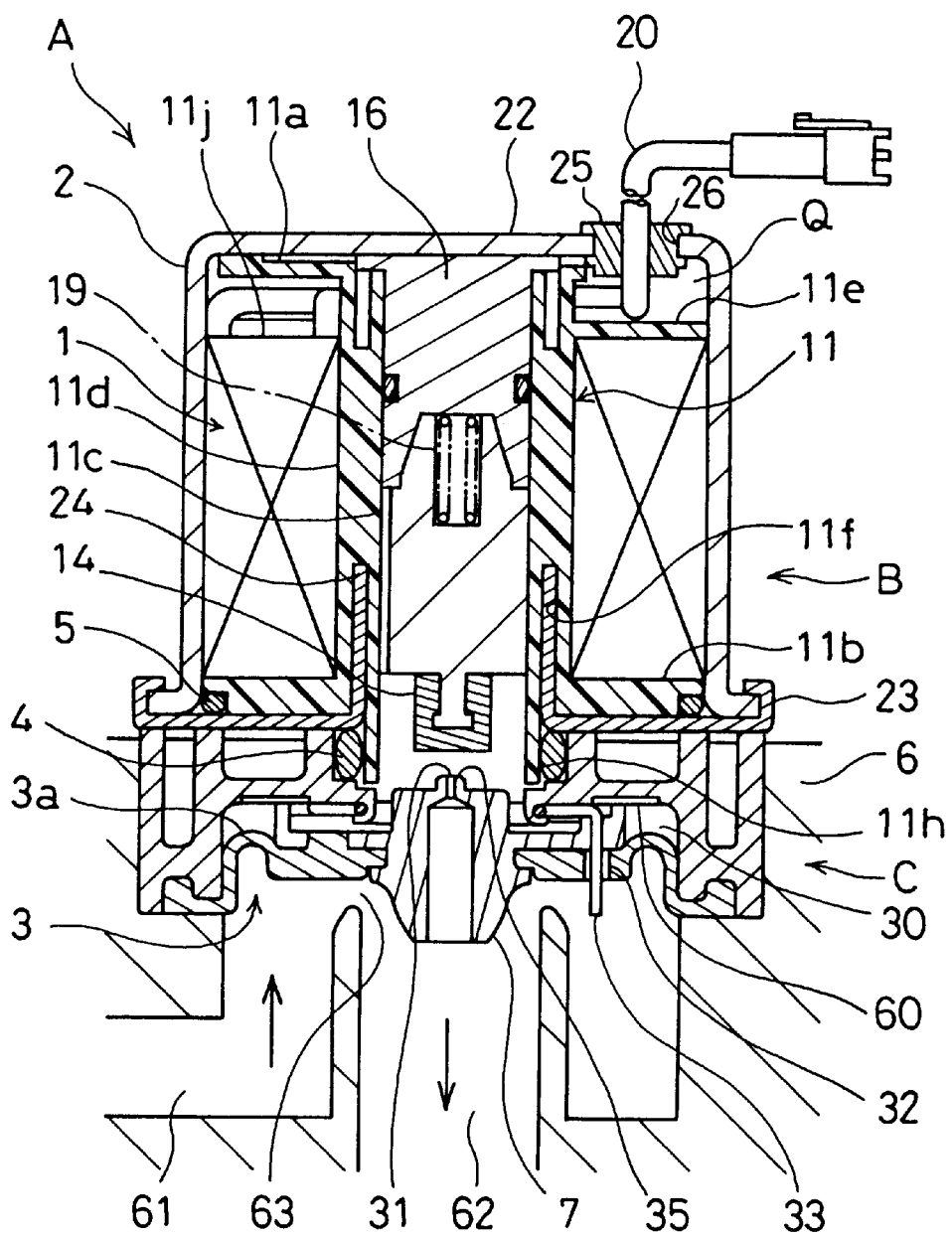
FIG. 14 is an explanatory view showing an embodiment of a solenoid valve.

Meanwhile, an explanation has been given of the embodiment where the solenoid B is driven by a battery, however, an AC power source may be used. In this case, the permanent magnet 17 is dispensed with since the battery life or the like needs not to be considered and therefore, a constitution as illustrated by FIG. 14 can be provided. In FIG. 14, notation 11j designates a notched portion provided in the partition flange 11e and the winding end 20 constituted by a start point of winding and an end point of winding of the coil winding 12 are introduced from the notched portion 11j into the coil winding end treating space Q. Incidentally, a similar constitution is provided in the preceding case of the solenoid B (FIGS. 1 through 3) driven by a battery although not illustrated.

Figure 15:
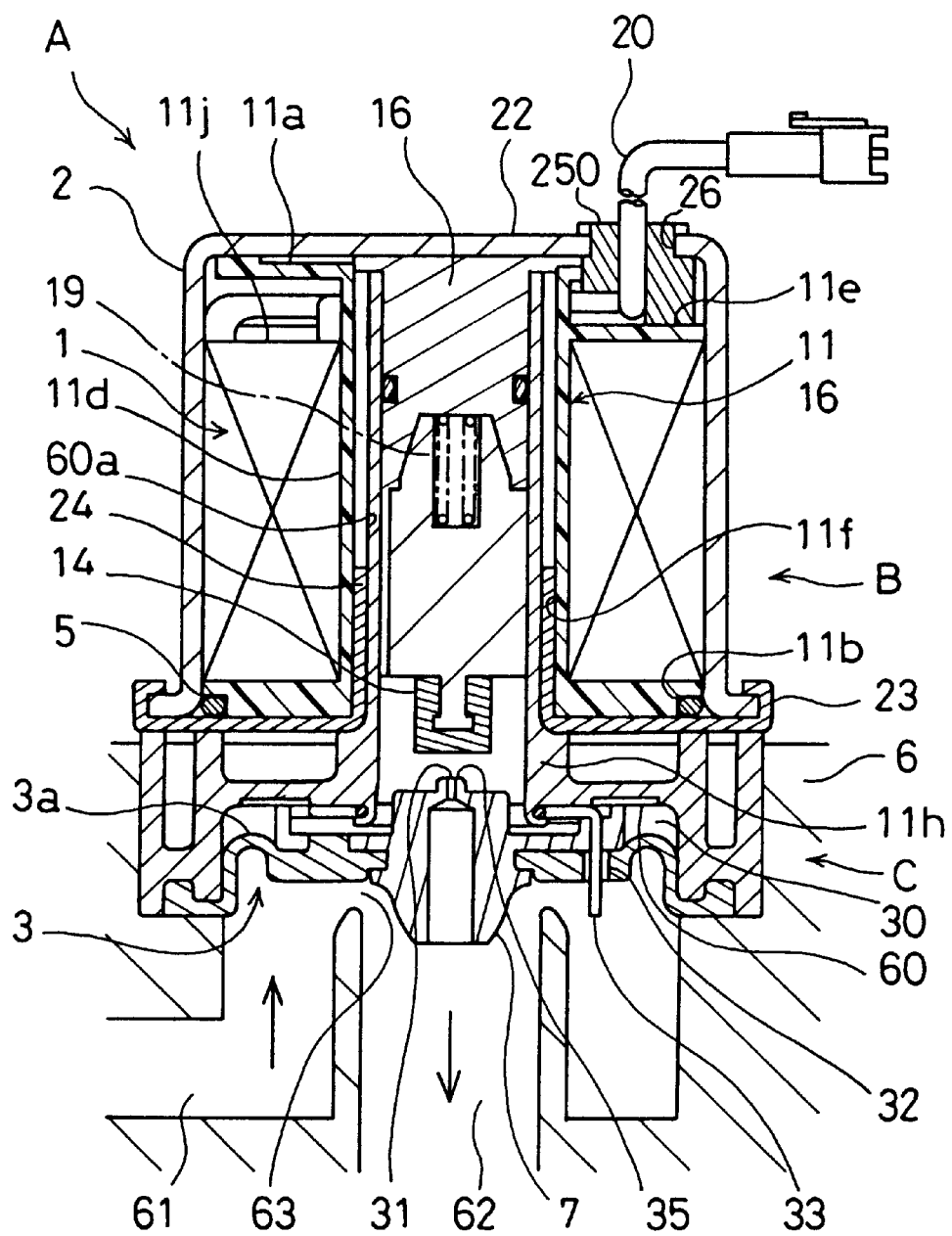
FIG. 15 is an explanatory view showing other embodiment of a solenoid valve.

Further, in FIG. 14, the plunger 15 is abrasively moved in the longitudinal hole 11c provided in the bobbin 11, however, a constitution shown by FIG. 15 may be provided. According to FIG. 15, a cylindrical extended portion 60a provided integrally with the diaphragm valve C made of resin, is inserted into the longitudinal hole 11c of the bobbin 11 and the plunger 15 is abrasively moved inside of the cylindrical extended portion 60a. Incidentally, this modified example is applicable also to each of the solenoids where the permanent magnet is arranged that is shown by each of FIGS. 1 through 3.

Figure 16:
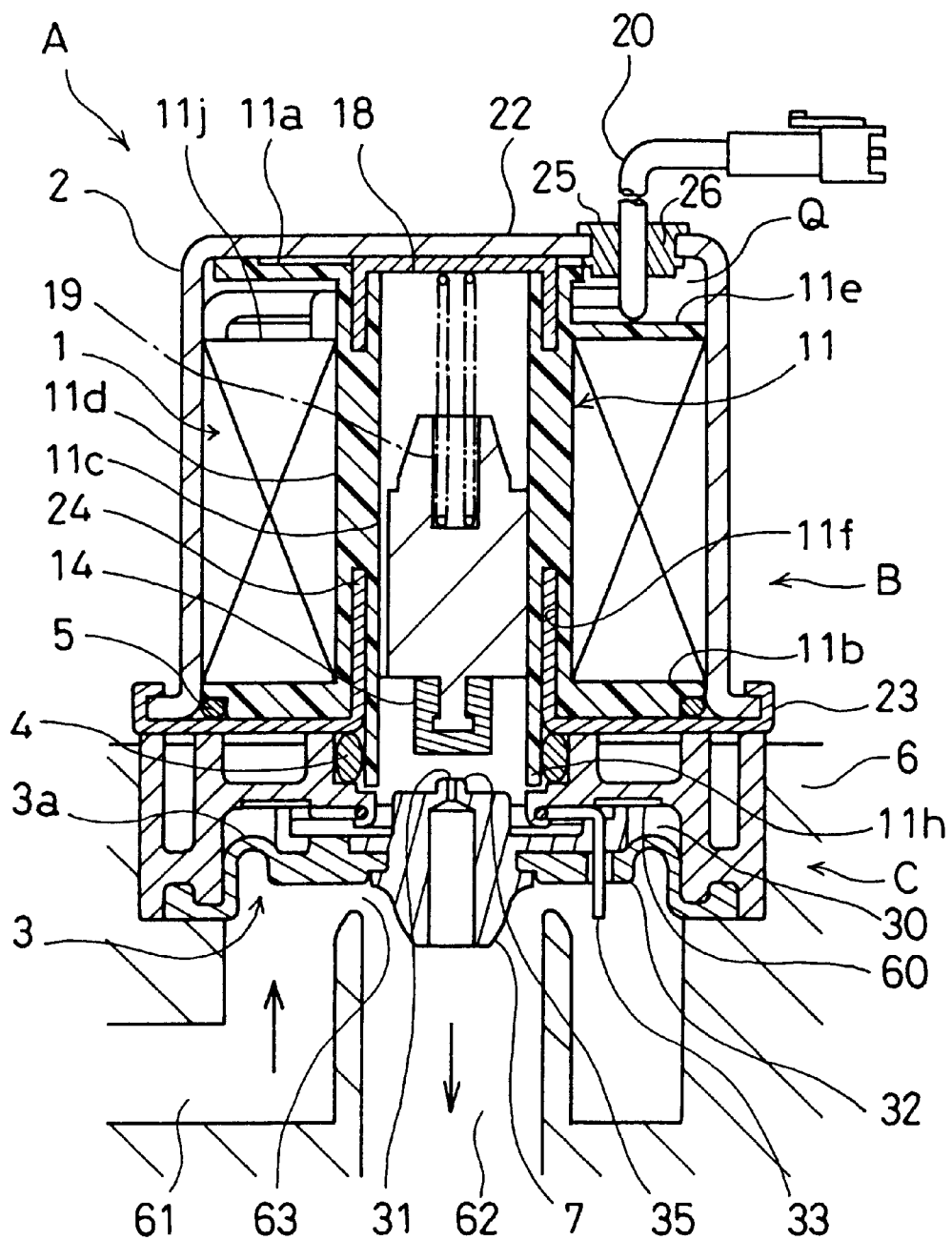
FIG. 16 is an explanatory view showing still other embodiment of a solenoid valve.

Further, each of the solenoids shown by FIG. 14 and FIG. 15 may be constituted by a solenoid shown by FIG. 16 where the pole core 16 is omitted and only the above-mentioned adjusting member 18 is installed at the top of the longitudinal hole 11c. In this case, the adjusting member 18 is installed to achieve not the function of adjusting the magnetic field but a function of forming a magnetic path of the electromagnetic field by the coil winding 12.

In any of the solenoids of FIG. 14 through FIG. 16, the plunger 15 is moved abrasively in resin and therefore, the dynamic frictional resistance can be decreased and a force necessary for moving the plunger 15 can be reduced.

Further, an another embodiment is shown in FIG. 15 with respect to a rubber bust 250. According to the rubber bush 250, the lower end of the rubber bush 250 is brought into contact with the partition flange 11e of the bobbin 11, the shape of the middle portion is the same as a notch installed to the upper flange 11a (the notch is provided a little larger than the opening 26 at the upper portion of the yoke) and is projected from the upper flange 11a by a little amount and a projecting portion having a shape substantially the same as that of the opening 26 is provided upward therefrom. By such a constitution the rubber bush 250 can be attached to the winding end portion 20 of the coil winding 12 wound around the bobbin 11 and can be integrated by inserting into the yoke 2 in a state where the rubber bush is fixed between the upper flange 11a of the bobbin 11 and the partition flange 11e and accordingly, the integration thereof is facilitated more than that shown in FIG. 14.

Figure 17A:
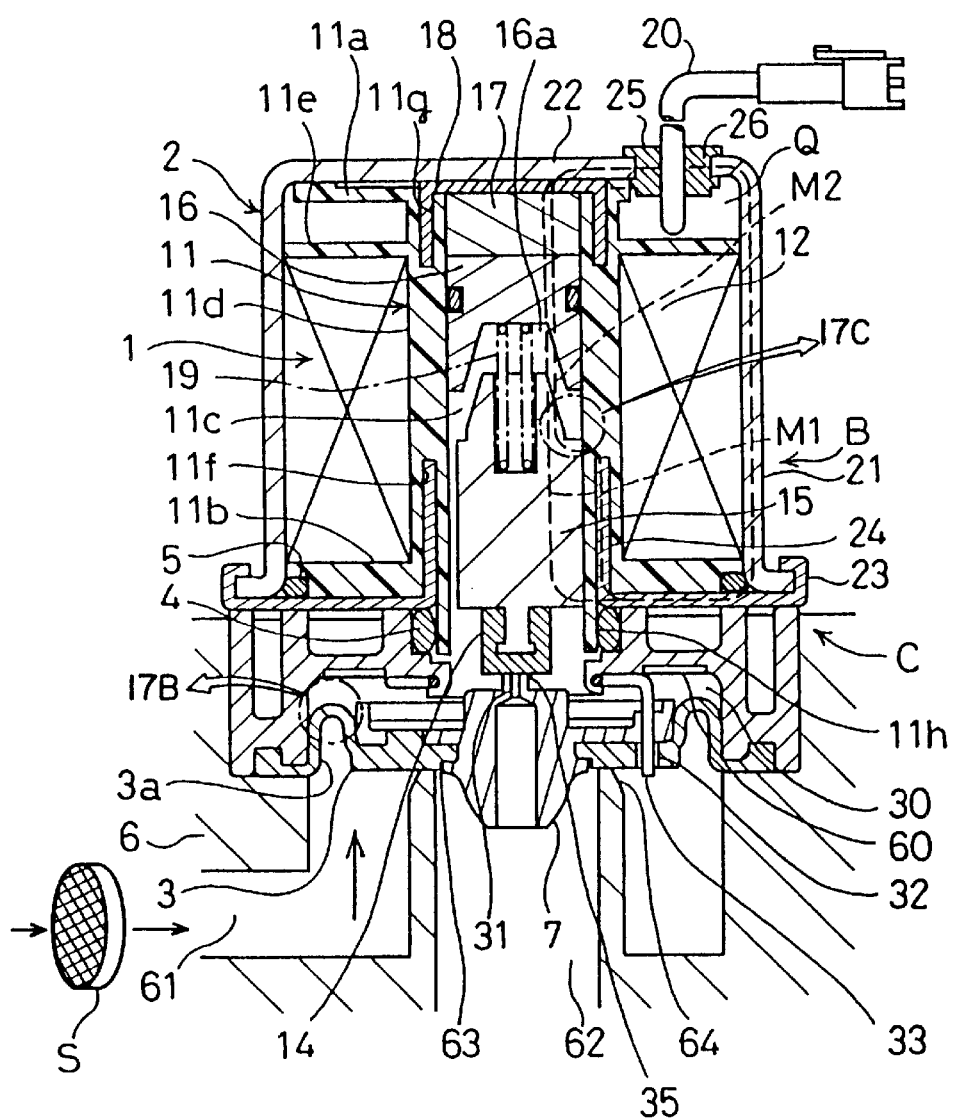
FIG. 17 is an explanatory view showing still other embodiment of a solenoid valve.
Figure 17B:
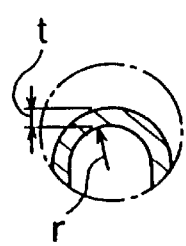
Figure 17C:
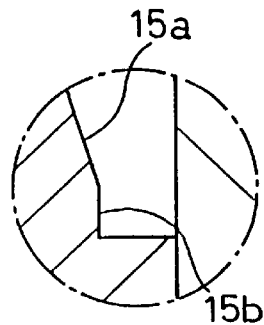

Further, the solenoid valve A illustrated by FIG. 17 may be constituted. According to the solenoid valve A, the procedure of forming the recess 11f at the lower portion of the peripheral wall 11d in the bobbin 11 is different from that illustrated by FIG. 1. That is, as shown by FIG. 17, the recess 11f is formed by a depth adapted to the raised height of the projection 24 such that no clearance remains at the top end of the projection 24 for forming the irregular magnetic field. However, the raised height of the projection 24 is previously adjusted such that the magnetic force of the irregular magnetic field M2 is developed to the plunger 15 by the maximum magnetic force as shown by FIG. 7. That is, the recess 11f is formed by a depth having a dimension substantially equal to that of a predetermined raised height after predetermining the raised height of the projection 24 in this way. The magnetic force of the irregular magnetic field M2 can be developed most efficiently to the plunger 15 by the maximum magnetic force even with the solenoid valve A of FIG. 17 and therefore, the solenoid B and accordingly, the solenoid valve A can further be downsized through downsizing the coil winding 12 per se.

As described above, according to the solenoid valve A illustrated by FIG. 17, the downsizing is realized by adjusting the magnetic force of the irregular magnetic field M2 through adjusting the raised height of the projection 24. However, if simplification of handling of the projection 24 is intended more than the downsizing of the solenoid B or the solenoid valve A, the projection 24 may be raised and formed from the end of the lower end plate 23 by adopting the structure shown by FIG. 17. That is, if the depth of the recess 11f and the raised height of the projection 24 are rendered substantially the same without adjusting the raised height of the projection 24, the simplification of handling the projection 24 can be achieved by integrating it with the lower end plate 23. Also in this case, downsizing to some degree can be achieved by promoting the magnetic efficiency by the irregular magnetic field M2.

Figure 18:
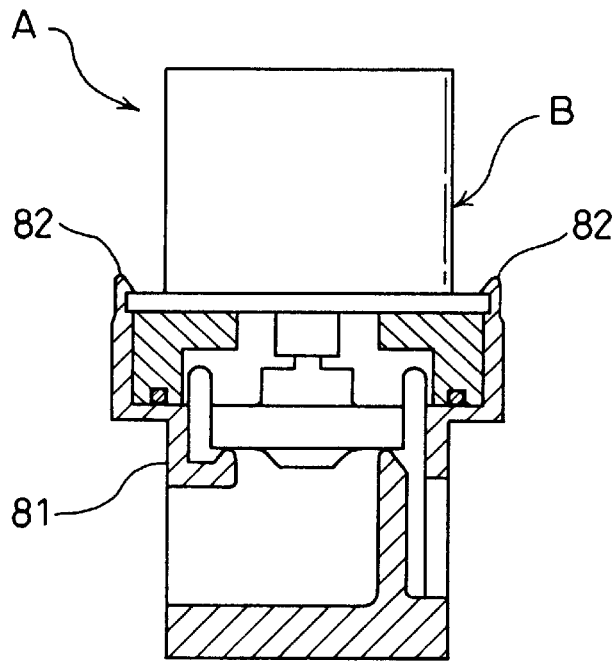
FIG. 18 is an explanatory view of a solenoid valve according to other embodiment.

Next, an explanation will be given of the solenoid valve A of a cartridge type in reference to FIG. 18 and FIG. 19. FIG. 18 illustrates a tacking structure of the solenoid valve A and FIG. 19 illustrates a fixing structure of solenoid valve A.

According to the tacking structure shown by FIG. 18, a main seat 81 made of resin is used for attaching the solenoid valve A to a valve main body 80. The main seat 81 is provided with stopper claws 82 at four corners of an upper edge thereof and the solenoid B is tacked by the stopper claws 82. Further, according to the tacking structure, the solenoid B is tacked to the main seat 81 whereby a single unit is constituted and handling by the unit can be carried out.

Therefore, the solenoid B is not separated from the main seat 81 in shipping or the like by which the reliability of the cartridge can be promoted. Also, cost is reduced since taping, bagging or the like can be dispensed with.

Figure 19:
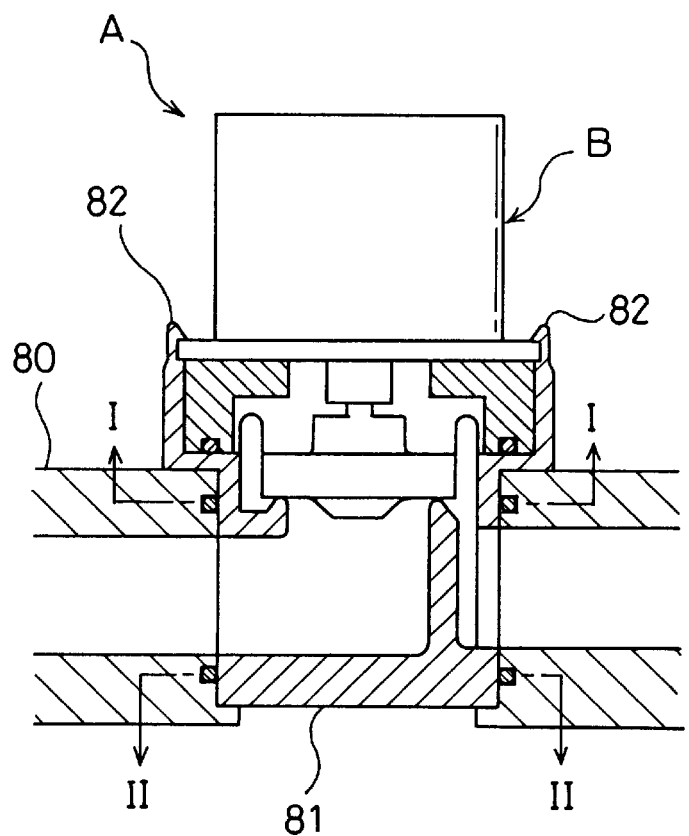
FIG. 19 is an explanatory view showing an attaching state of the solenoid valve according to the other embodiment.

According to such a cartridge type of the solenoid valve A, as shown by FIG. 19, pressure receiving areas of the primary side pressure when the solenoid valve is attached to the valve main body 80, are constituted by a section I-I and a section II-II which are the same. Accordingly, pressures applied on the section I-I and the section II-II are canceled by each other and a force resisting the primary pressure is not necessary for attaching thereof. Therefore, solid fixing by screwing or by using a stopper ring or the like is not necessary but, for example, attachment by fitting or pinning of resin can be performed whereby the attaching operation is facilitated and reduction in cost can be achieved.

Next, an explanation will be given of a circuit of the solenoid valve A according to the embodiment in reference to FIG. 20.

This example is carried out to achieve long life of a battery by dispensing with unnecessary power supply as less as possible since current to the solenoid is gradually decreased from an initial value and finally sufficient power supply is not carried out due to an increase in the internal resistance of the battery or by an increase in the internal resistance through consumption of its capacity when a battery is used as the power source for driving the solenoid.

Figure 20:
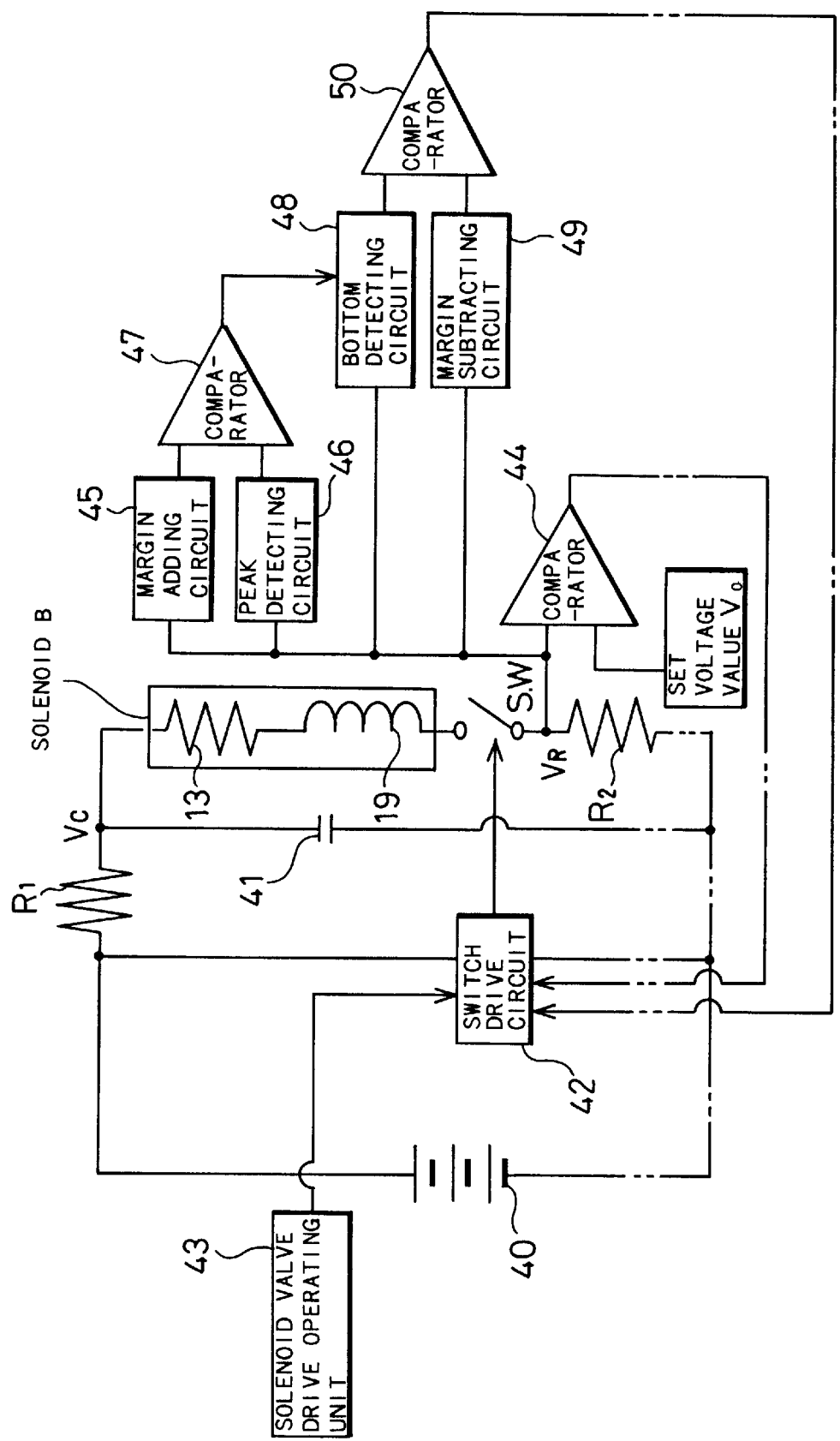
FIG. 20 is an explanatory view showing a circuit of a solenoid.

That is, as shown by FIG. 20, a battery 40 having a predetermined internal resistance and providing an electromotive force, is integrated to the circuit and the battery constitutes the power source of the solenoid valve A. The battery 40 is connected to the solenoid B via a constant resistor R1 on the side of a plus terminal and a switch SW is connected thereto via a constant resistor R2 on the side of a minus terminal. Further, the circuit is opened and closed by the switch SW.

Also, a condenser 41 is connected to a position upstream from the solenoid B and the switch SW in parallel with the battery 40, the solenoid B and the switch SW. The capacitance of the condenser 41 is determined such that charge capable of supplying drive current to the solenoid B when the switch SW is closed, can be stored.

The switch SW is opened and closed by a switch drive circuit 42 provided in parallel with the battery 40 and the switch drive circuit 42 can measure drive time by a counter or the like installed thereto. Also, the switch drive circuit 42 outputs pulse signals generated during a constant time period by a drive signal from a solenoid valve drive operating unit 43 and the switch SW is closed over a time period of outputting the pulse signals.

Therefore, when the switch SW is closed by the switch drive circuit 42, current from the condenser 41 is mainly made to flow in the solenoid B. Therefore, the current value in driving the solenoid B can firmly be provided irrespective of the magnitude of the internal resistance of the battery 40 and an amount of current conduction can be made substantially constant. Accordingly, it is advantageous in view of power consumption.

Further, a minus side input terminal of a comparator 44 is connected to an intermediary between the switch SW and the constant resistor R2 and a voltage value VR applied on the constant resistor R2 that is proportional to current flowing in the solenoid B, is compared with a set voltage value V0 applied on the other input terminal of the comparator 44.

The comparator 44 is constituted to output a signal to the switch drive circuit 42 when the voltage value VR of the constant resistor R2 becomes the set voltage value V0 or exceeds it.

Further, the switch drive circuit 42 is constituted to conduct electricity by closing the switch SW by the drive signal from the solenoid valve drive operating unit 43 and disconnect electricity by opening the switch SW by the signal from the comparator 44.

Meanwhile, the set voltage value V0 is a voltage value generated in the constant resistor R2 based on a value of current flowing in the solenoid B when the motion of the plunger 15 of the solenoid B is stopped. Accordingly, a minimum electricity conduction time period necessary for driving the solenoid valve A can always be obtained irrespective of the magnitude of load applied on the plunger 15 whereby wasteful power consumption can be prevented.

Further, both input terminals of a comparator 47 for peak detection ON are connected to an intermediary between the switch SW and the comparator 44 respectively via a margin adding circuit 45 and a peak detecting circuit 46. Also, both input terminals of a comparator 55 for bottom detection ON are connected thereto via a bottom detecting circuit 48 and a margin subtracting circuit 49.

Figure 21:
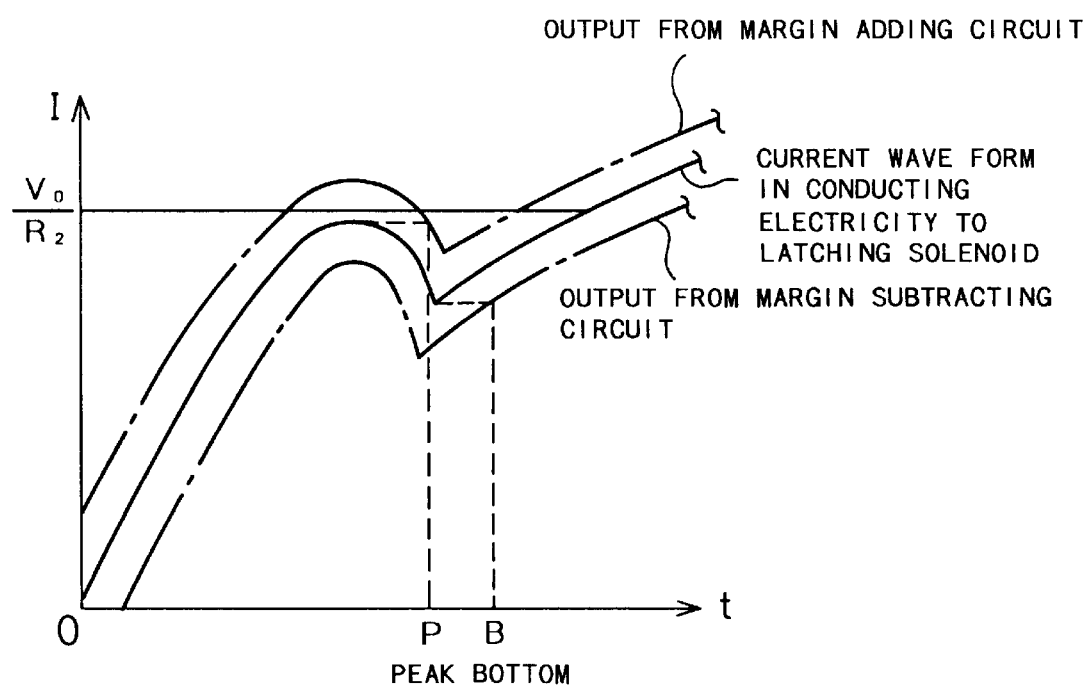
FIG. 21 is a graph showing a time versus current characteristic in conducting electricity to the solenoid.

Meanwhile, a time versus current characteristic of the solenoid B in conducting electricity is as illustrated by FIG. 21. That is, when electricity starts conducting in the electromagnetic coil of the solenoid B, current is increased by applying voltage on the electromagnetic coil 1 and after a predetermined time period, the current is once decreased by generation of an inverse electromotive force accompanied by the movement of the plunger 15. Further, the inverse electromotive force becomes null by opening or closing the diaphragm valve C and accordingly, the current continues rising thereafter.

The peak detecting circuit 46 is constituted to detect at any time a maximum value of the flowing current and detects a maximum value of the current caused by the voltage applied on the electromagnetic coil 1. Further, it outputs the detected maximum value of the current to the comparator 47 for peak detection ON.

The comparator 47 for peak detection ON compares the maximum value of the current with an output provided from the margin adding circuit 45 where a predetermined margin is added to the waveform of current in conducting electricity to the solenoid B. When the output provided from the margin adding circuit 45 is decreased after exceeding the maximum value of the current, the comparator 47 stops the peak detecting circuit 46 from operating at the time point and starts the bottom detecting circuit 48 operating.

The bottom detecting circuit 48 is constituted to detect a minimum value of the flowing current and detects the minimum value of the current when the diaphragm valve C is opened, that is, when the inverse electromotive force becomes null. Further, it outputs the minimum value of the current to the comparator 50 for bottom detection ON.

The comparator 50 for bottom detection ON compares the minimum value of the current with an output provided from the margin subtracting circuit 49 where a predetermined margin is subtracted from a waveform of current in conducting electricity to the solenoid B and when the output provided from the margin subtracting circuit 49 is increased after exceeding the minimum value of current, electricity conduction from the battery 40 to the electromagnetic coil 1 is stopped at the time point.

In this way, the circuit of the solenoid valve A in the embodiment stops conducting electricity to the solenoid B by time or the time point where either of the set voltage value V0 and the minimum value of the solenoid current is detected. Therefore, wasteful power consumption of the battery 40 is prevented whereby long life thereof can be achieved.

Although an explanation has been given of the embodiment as described above where the solenoid B or the solenoid valve A according to the present invention is used for water supply control, the present invention is not limited thereto but can be used in various usages such as an opening and closing valve for gas and the like. For example, according to the diaphragm valve C having the solenoid valve A, the downsizing thereof can be performed to an extent where the outer diameter is about 22 mm and the height is about 21 mm and therefore, it can be integrated to a cock per se as shown by FIG. 22.

Figure 22:
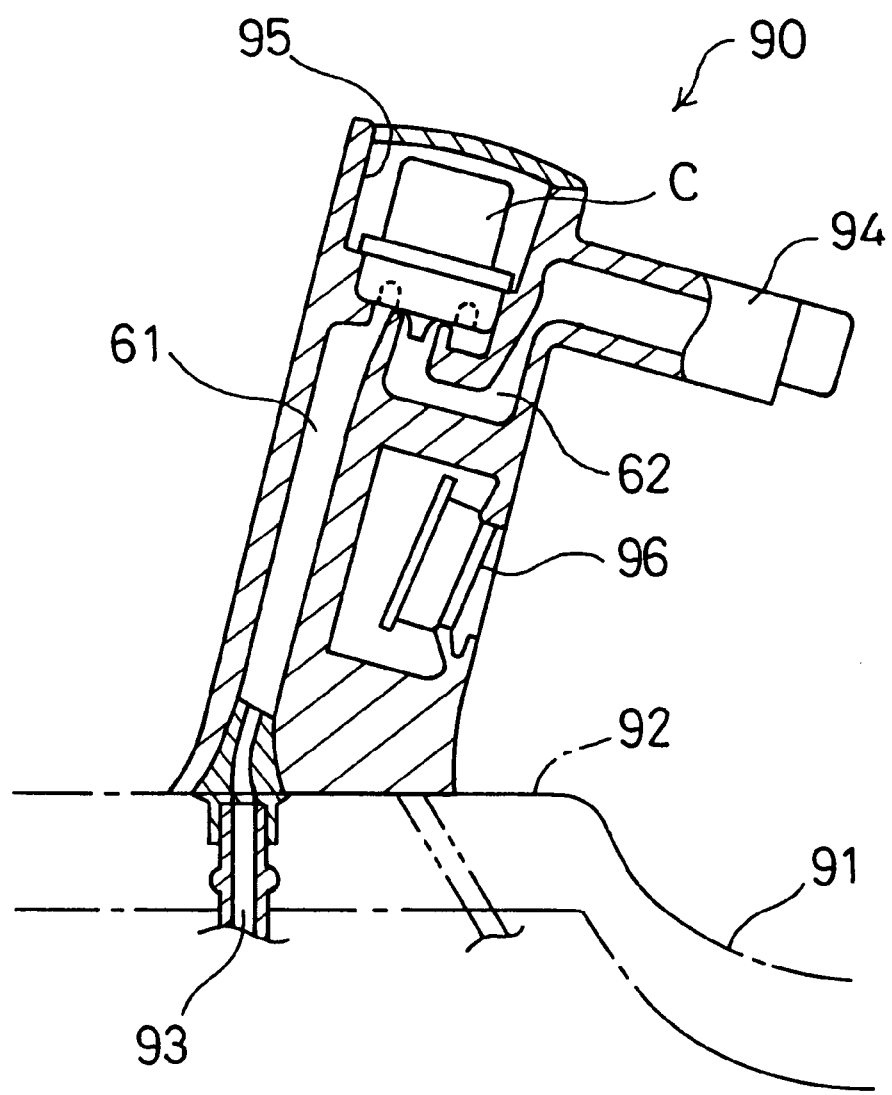
FIG. 22 is an outline sectional view for explaining a cock 90 integrated with a diaphragm valve C of the embodiments.

That is, a cock 90 shown by FIG. 22 is fixed onto an upper face of a counter 92 at the inner side of a wash basin 91 and is provided with a substantially cylindrical shape having a diameter of about 45 mm. Further, a flow-in path 61 on the primary side communicated with a water supply tube 93 is communicated with a flow-out path 62 on the secondary side by the diaphragm valve C whereby water is discharged from a discharge port 94 toward the wash basin 91. In this case, the cock 90 is provided with the diameter of about 45 mm and accordingly, a recess 95 having the inner diameter of about 30 mm can be formed and the diaphragm valve C having the outer diameter of about 22 mm is integrated to the recess. Although the recess 95 can be formed at the top portion of the cock 90 in this way, according to a conventional diaphragm valve, it cannot be downsized to a size capable of integrating to the recess and accordingly, the conventional diaphragm valve is integrated to the lower face of the counter 92. Therefore, an operation at the bottom face of the counter is needed at every time of maintenance and check of the valve. However, according to the diaphragm valve C capable of integrating to the cock 90, the maintenance and check can be simplified. Incidentally, the cock 90 is provided with a sensor 96 for detecting hand put into the wash basin 91 and is constituted to move the plunger 15 of the solenoid valve to the valve opening side by a signal from the sensor.

INDUSTRIAL APPLICABILITY

As has been explained, the solenoid valve A according to the present invention has a function capable of forming the recess 95 having the inner diameter of about 30 mm at the top portion since the cock 90 is provided with the diameter of about 45 mm and is suitable for downsizing down to about one severalth in volume while maintaining the recess and is suitable for utilizing to various valves such as a solenoid valve for water supply control, an opening and closing valve for gas and the like or a solenoid constituting drive sources thereof.

What is claimed is:

1. A solenoid for driving a plunger, comprising:
   an electromagnetic coil having a region-defining member made of a nonmagnetic material for defining a moving region in which said plunger is moving, and a coil winding portion wound around said region-defining member to generate a magnetic field of a first magnetic flux path penetrating said moving region along a direction of moving of said plunger, said electromagnetic coil exerting a magnetic force of said first magnetic flux path on said plunger;
   an irregular magnetic field forming member made of a magnetic material and arranged at an external side of a partitioning face formed to partition said moving region and on an end side of said region-defining member opposed to said plunger, said irregular magnetic field forming member forming a second magnetic flux path of the magnetic field formed by said electromagnetic coil at the external side of said partitioning face from said end side of said region-defining member, said irregular magnetic field forming member exerting a magnetic force of said second magnetic path from a top end of said irregular magnetic field forming member on said plunger via said partitioning face; and
   an encapsulating member having an encapsulating portion formed to be able to arrange one of said irregular magnetic field forming members on said end side of said region-defining member opposed to said plunger, said irregular magnetic field forming members having different lengths from said end side of said region-defining member to said encapsulating member at the external side of said partitioning face.

2. The solenoid according to claim 1, further comprising a return spring for separating said plunger from the pole core, said return spring having a separating force set to be larger than a suction force of a magnetic field of said permanent magnet at an upper limit position which is reached by said plunger after naturally falling from a position at which said plunger is sucked to said pole core and being bounded by a valve seat.

3. A solenoid for driving a plunger, comprising:

an electromagnetic coil having a region-defining member made of a nonmagnetic material for defining a moving region in which said plunger is moving, and a coil winding portion wound around said region-defining member to generate a magnetic field of a first magnetic flux path penetrating said moving region along a direction of moving of said plunger, said electromagnetic coil exerting a magnetic force of said first magnetic flux path on said plunger;

an irregular magnetic field forming member made of a magnetic material and arranged at an external side of a partitioning face formed to partition said moving region and on an end side of said region-defining member opposed to said plunger, said irregular magnetic field forming member forming a second magnetic flux path of the magnetic field formed by said electromagnetic coil at the external side of said partitioning face from said end side of said region-defining member, said irregular magnetic field forming member exerting a magnetic force of said second magnetic path from a top end of said irregular magnetic field forming member on said plunger via said partitioning face; and an encapsulating member having an encapsulating portion formed to be able to arrange one of said irregular magnetic field forming members at the external side of said partitioning face and on said end side of said region-defining member opposed to said plunger, wherein said irregular magnetic field forming member is arranged at said encapsulating portion after adjusting of a magnitude of the magnetic force exerted on said plunger.

4. The solenoid according to claim 1 or claim 2, wherein said region-defining member comprises a bobbin to partition a longitudinal hole in which said plunger is moving, said bobbin having a peripheral wall having a recess formed to subside along said longitudinal hole such that said irregular magnetic field forming member can be arranged opposed to said plunger;

wherein said electromagnetic coil is provided with a coil winding directly wound around said peripheral wall of said bobbin; and wherein said irregular magnetic field forming member is arranged to fit into said recess.

5. The solenoid according to claim 4, further comprising:

a yoke having an upper side end plate and a lower end plate disposed above and below said electromagnetic coil respectively, and a peripheral side plate disposed between said electromagnetic coil;

a pole core arranged at one end of said longitudinal hole in contact with said upper end plate; and wherein said irregular magnetic field forming member is installed adjacent to an end portion of said lower end plate on a side of said peripheral wall.

6. The solenoid according to claim 4, wherein said bobbin is provided with a projecting portion extended more externally than said peripheral wall which is extended from said lower end plate.

7. The solenoid according to claim 4, further comprising a magnetic path gap formed between a projection for forming the irregular magnetic field and said pole core, wherein said magnetic path gap is arranged at an approximately central portion of said electromagnetic coil.

8. The solenoid according to claim 5, further comprising a permanent magnet arranged at an external side of said pole core.

9. A solenoid comprising an electromagnetic coil including a longitudinal hole formed at a central portion of a bobbin made of a nonmagnetic material and a coil winding wound around a peripheral wall thereof, a yoke having a peripheral side plate, an upper end plate and a lower end plate to cover an outer peripheral face and both end faces of said electromagnetic coil, a pole core arranged at one end of said longitudinal hole and a plunger inserted movably into said longitudinal hole, a coil winding end treating space where said coil winding is not wound being formed at an outer peripheral face of said pole core, an opening for drawing a coil winding of a coil winding end portion to outside being provided to said yoke and said opening being closed by waterproofing means.

10. The solenoid according to claim 9, wherein said opening is closed by a rubber bush.

11. A solenoid comprising an electromagnetic coil having a longitudinal hole formed at a central portion of a bobbin made of a nonmagnetic material and a coil winding wound around a peripheral wall thereof, a yoke arranged at an outer periphery of said electromagnetic coil, a pole core arranged at one end of said longitudinal hole and a plunger inserted movably into said longitudinal hole, a permanent magnet being arranged at an external side of said pole core and a coil winding end portion treating space where said coil winding is not wound being formed at an outer peripheral face of said bobbin corresponding to said permanent magnet.

12. The solenoid according to claim 10, further comprising a magnetic member surrounding said permanent magnet over a side face thereof and adjusting a magnetism which is exerted by a magnetic field formed by said permanent magnet on said plunger.

13. The solenoid according to claim 11, wherein major components of said permanent magnet are constituted by rare earth metals.

14. A solenoid valve wherein a pilot valve hole and a bleed hole are installed to a diaphragm and a main valve hole is opened and closed by opening and closing said pilot valve hole by a movement operation of a plunger of a solenoid, said diaphragm having a reaction force characteristic where a reaction force is maintained constant during at least a first stroke and said reaction force is proportional to a water pressure below said first stroke.

15. The solenoid valve according to claim 14, wherein said at least first stroke is a stroke at a water pressure lower limit.

16. The solenoid valve according to claim 14 or claim 15, wherein a thickness of a film of said diaphragm is set to approximately 0.4 mm or less and a hardness of rubber of this film is set to approximately 80 degrees or less.

17. The solenoid valve according to claim 14, wherein said pilot valve hole is installed at a central portion of said diaphragm, said bleed hole is installed at a position adjacent to said pilot valve hole and a rectifying cone having a shape where a peripheral face is smoothly squeezed toward a direction of a flowing fluid, said rectifying cone being formed around said pilot valve hole.

18. The solenoid valve according to claim 17, wherein a length of said rectifying cone is substantially equal to a length of a maximum stroke of the diaphragm.

19. A solenoid valve comprising a diaphragm having a pilot valve hole and a bleed hole and a pin penetrating through said bleed hole where a main valve hole is opened and closed by opening and closing said pilot valve hole by a movement operation of a plunger of a solenoid, a strainer being installed on a primary side of water supply of said solenoid valve, and a sectional area of a gap between said bleed hole and said pin being fixed to be substantially equal to or larger than a mesh of said strainer.

* * * * *